United States Patent
Jung et al.

(10) Patent No.: US 9,439,229 B2
(45) Date of Patent: Sep. 6, 2016

(54) METHOD AND APPARATUS FOR PERFORMING PAIRING BETWEEN COORDINATOR AND DEVICE IN NETWORK, METHOD AND APPARATUS FOR PERFORMING PAIRING BETWEEN DEVICES, NETWORK SYSTEM INCLUDING THE COORDINATOR AND THE DEVICES

(75) Inventors: Soo-yeon Jung, Seoul (KR); Hae-young Jun, Seoul (KR); Hyuk-choon Kwon, Seoul (KR); Ho-dong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 13/102,759

(22) Filed: May 6, 2011

(65) Prior Publication Data
US 2011/0274098 A1 Nov. 10, 2011

Related U.S. Application Data

(60) Provisional application No. 61/332,330, filed on May 7, 2010, provisional application No. 61/332,369, filed on May 7, 2010, provisional application No. 61/332,348, filed on May 7, 2010.

(30) Foreign Application Priority Data

Nov. 18, 2010 (KR) .................. 10-2010-0115120

(51) Int. Cl.
- *H04W 4/00* (2009.01)
- *H04W 76/02* (2009.01)
- *H04W 8/00* (2009.01)
- *H04W 48/08* (2009.01)

(52) U.S. Cl.
CPC .......... *H04W 76/023* (2013.01); *H04W 8/005* (2013.01); *H04W 48/08* (2013.01)

(58) Field of Classification Search
USPC ........................................... 370/338
See application file for complete search history.

(56) References Cited

U.S. PATENT DOCUMENTS

| | | | |
|---|---|---|---|
| 8,886,744 B1* | 11/2014 | Pabla | G06F 9/505 709/217 |
| 2004/0148406 A1* | 7/2004 | Shima | 709/228 |
| 2004/0214571 A1* | 10/2004 | Hong | 455/435.1 |
| 2006/0203837 A1* | 9/2006 | Shvodian | 370/445 |
| 2007/0087682 A1* | 4/2007 | DaCosta | 455/3.01 |
| 2007/0280157 A1* | 12/2007 | Kwon et al. | 370/329 |
| 2009/0022130 A1* | 1/2009 | Yu et al. | 370/338 |
| 2010/0010899 A1* | 1/2010 | Lambert et al. | 705/14.58 |
| 2010/0061355 A1* | 3/2010 | Tsuchiya | 370/338 |
| 2010/0150157 A1* | 6/2010 | Wang | H04L 67/104 370/392 |
| 2011/0176503 A1* | 7/2011 | Patel et al. | 370/329 |

* cited by examiner

*Primary Examiner* — Huy D Vu
*Assistant Examiner* — Kevin Cunningham
(74) *Attorney, Agent, or Firm* — Sughrue Mion, PLLC

(57) ABSTRACT

Provided are methods and apparatuses for performing pairing. A method of performing pairing between a coordinator that belongs to a predetermined network and a device that does not belong to any network includes: broadcasting a first pairing information indicating that the coordinator is a device to perform pairing, or a beacon comprising the first pairing information; and receiving, from the device, second pairing information indicating that the device is a peer device to perform pairing, wherein the device transmits the second pairing information to the coordinator after the device associates with the predetermined network or while the device associates with the predetermined network.

5 Claims, 19 Drawing Sheets

METHOD AND APPARATUS FOR PERFORMING PAIRING BETWEEN COORDINATOR AND DEVICE IN NETWORK, METHOD AND APPARATUS FOR PERFORMING PAIRING BETWEEN DEVICES, NETWORK SYSTEM INCLUDING THE COORDINATOR AND THE DEVICES

CROSS-REFERENCE TO RELATED PATENT APPLICATIONS

This application claims the benefit of U.S. Provisional Application No. 61/332,348, filed on May 7, 2010, U.S. Provisional Application No. 61/332,330, filed on May 7, 2010, and U.S. Provisional Application No. 61/332,369, filed on May 7, 2010, and claims priority from Korean Patent Application No. 10-2010-0115120, filed on Nov. 18, 2010 in the Korean Intellectual Property Office, the disclosures of which are incorporated herein in their entireties by reference.

BACKGROUND

1. Field

Apparatuses and methods consistent with exemplary embodiments relate to performing pairing between a coordinator and a device in a network, performing pairing between devices, and a network system including the coordinator and the devices.

2. Description of the Related Art

Recently, a variety of near field communication methods, such as Wi-Fi, Bluetooth, and the like, have been widely used as communication protocols between devices. In such near field communication methods, a communication protocol between devices can be more easily set by using Wi-Fi Direct, Wi-Fi Protected Setup (WPS), or the like. In this regard, setting of a communication protocol so as to perform communication between devices is referred to as pairing.

Also, a communication method using a 60 GHz frequency band so as to perform large-capacity high-speed transmission has been identified as an extended type of Wi-Fi communication method. A method of performing pairing between devices is needed in the communication method using a 60 GHz frequency band.

SUMMARY

Aspects of one or more exemplary embodiments provide a method and an apparatus for performing pairing between a coordinator and a device in a network, a method and an apparatus for performing pairing between devices, and a network system including the coordinator and the devices.

According to an aspect of an exemplary embodiment, there is provided a method of performing pairing between a coordinator that belongs to a predetermined network and a device that does not belong to any network, the method including: broadcasting a beacon including first pairing information indicating that the coordinator is a device to perform pairing, or the first pairing information; and receiving second pairing information indicating that the device is a peer device to perform pairing, from the device, wherein the device transmits the second pairing information to the coordinator after the device associates with the predetermined network or while the device associates with the predetermined network.

The receiving the second pairing information may include: receiving an association request to associate with the predetermined network from the device; transmitting an association response that approves the association request, to the device; and receiving the second pairing information from the device.

The receiving the second pairing information may include: receiving the association request that includes the second pairing information to associate with the predetermined network from the device; and transmitting an association response that approves the association request, to the device.

The first pairing information may include first Push Button Configuration (PBC) information indicating that a button for instructing to perform pairing has been pushed in the coordinator, and a media access control (MAC) address of the coordinator, and the second pairing information may include second PBC information indicating that a button for instructing to perform pairing has been pushed in the device, and a MAC address of the device.

The first pairing information may further include an identifier regarding the network to which the coordinator belongs.

The broadcasting the beacon including the first pairing information or the first pairing information may include broadcasting the first pairing information in one time period from among time periods in which data transmission between the device and the coordinator is performed, or broadcasting the first pairing information in an announcement time period for notifying information in the network.

According to an aspect of another exemplary embodiment, there is provided a method of performing pairing between a first device that does not belong to any network and a second device that belongs to a predetermined network, by using a coordinator that belongs to the predetermined network, the method including: relaying third pairing information indicating that the second device is a device to perform pairing, from the second device to the first device; receiving second pairing information indicating that the first device is a peer device to perform pairing, from the first device; and broadcasting a beacon including the second pairing information and the third pairing information, or the second pairing information and the third pairing information, wherein the first device transmits the second pairing information to the coordinator after the first device associates with the predetermined network or while the first device associates with the predetermined network.

The relaying the third pairing information from the second device to the first device may include: receiving the third pairing information from the second device; and broadcasting a beacon including third pairing information, or the third pairing information.

The receiving the second pairing information may include: receiving an association request to associate with the predetermined network from the first device; transmitting an association response that approves the association request, to the first device; and receiving the second pairing information from the first device.

The receiving the second pairing information may include: receiving an association request that includes the second pairing information to associate with the predetermined network from the first device; and transmitting an association response that approves the association request, to the first device.

If the second device does not listen to the third pairing information or a beacon including the third pairing information from the coordinator within a predetermined amount of time, the second device may become a coordinator of a new network after establishing the new network.

The second pairing information may include second Push Button Configuration (PBC) information indicating that a button for instructing to perform pairing has been pushed in the first device, and a media access control (MAC) address of the first device, and the third pairing information may include third PBC information indicating that a button for instructing to perform pairing has been pushed in the second device, and a MAC address of the second device.

According to an aspect of another exemplary embodiment, there is provided a method of performing pairing between a first device that does not belong to any network and a second device that belongs to a first network, the method including: the first device becoming a coordinator of a second network after establishing the second network; broadcasting a beacon including second pairing information indicating that the first device is a device to perform pairing, or the second pairing information, wherein the broadcasting of the beacon or the second pairing information is performed by the first device; disassociating the second device from the first network; transmitting third pairing information indicating that the second device is a peer device to perform pairing, to the first device, wherein the transmitting of the third pairing information is performed by the second device; and associating the second device with the second network.

The method may further include, if a button for instructing to perform pairing is pushed in the first device, scanning a message from the coordinator of the first network for a first critical time, wherein, if the first device does not receive any message from the coordinator of the first network after the message is scanned, the first device may become the coordinator of the second network after establishing the second network.

The method may further include: transmitting the third pairing information to the coordinator of the first network, wherein the transmitting of the third pairing information is performed by the second device; broadcasting a beacon including the third pairing information, or the third pairing information, wherein the broadcasting of the beacon or the third pairing information is performed by the coordinator of the first network; scanning a message from the first device for a third critical time from the time when a second critical time has elapsed from the time when the coordinator of the first network has broadcasted the third pairing information; and if any message has not been received from the first device after the message is scanned, broadcasting the beacon including the third pairing information and a failure message, or the third pairing information and the failure message; and scanning a channel different from a channel that communicates with the coordinator of the first network, wherein the scanning of the different channel is performed by the second device, and wherein the second device receives a beacon including the second pairing information, or the second pairing information from the first device after the different channel is scanned.

The method may further include broadcasting a beacon including the second pairing information and the third pairing information, or the second pairing information and the third pairing information, wherein the broadcasting of the beacon or the second pairing information and the third pairing information is performed by the first device that has received the third pairing information.

The disassociating the second device from the first network may include: transmitting a disassociation request to disassociate from the first network to the coordinator of the first network, wherein the transmitting of the disassociation request is performed by the second device; and transmitting a disassociation response that approves the disassociation request, to the second device, wherein the transmitting of the disassociation request is performed by the coordinator of the first network, wherein the associating of the second device with the second network includes: transmitting an association request to associate with the second network to the first device, wherein the transmitting of the association request is performed by the second device; and transmitting an association response that approves the association request, to the second device, wherein the transmitting of the association response is performed by the first device.

According to an aspect of another exemplary embodiment, there is provided a method of performing pairing between a first device that does not belong to any network and a second device that belongs to a first network, the method including: the second device becoming a coordinator of a second network after establishing the second network at a channel different from a channel that communicates with a coordinator of the first network; broadcasting a beacon including third pairing information indicating that the second device is a device to perform pairing, or the third pairing information, wherein the broadcasting of the beacon or the third pairing information is performed by the second device; transmitting second pairing information indicating that the first device is a peer device to perform pairing, to the second device, wherein the transmitting of the second pairing information is performed by the first device; disassociating the second device from the first network; and associating the first device with the second network.

The method may further include: transmitting the third pairing information to the coordinator of the first network, wherein the transmitting of the third pairing information is performed by the second device; broadcasting a beacon including the third pairing information, or third pairing information, wherein the broadcasting of the beacon or the third pairing information is performed by the coordinator of the first network; scanning a message from the first device for a second critical time from the time when a first critical time has elapsed from the time when the coordinator of the first network has the broadcasted third pairing information; and if the second device does not receive any message from the first device after the message is scanned, broadcasting the beacon including the third pairing information and a failure message, or the third pairing information and the failure message, wherein, if the second device receives the beacon including the third pairing information and the failure message, or the third pairing information and the failure message, the second device becomes a coordinator of the second network after establishing the second network.

The method may further include broadcasting a beacon including the second pairing information and the third pairing information, or the second pairing information and the third pairing information after the second device disassociates from the first network, wherein the broadcasting of the beacon or the second pairing information and the third pairing information is performed by the second device.

According to an aspect of another exemplary embodiment, there is provided a method of performing pairing between a third device and a fourth device that do not belong to any network, the method including: the third device becoming a coordinator of a third network after establishing the third network; broadcasting a beacon including fourth pairing information indicating that the third device is a device to perform pairing, or the fourth pairing information, wherein the broadcasting of the beacon or the fourth pairing information is performed by the third device; receiving an association request to associate with the third network, from the fourth device; transmitting an association response that approves the association request, to the fourth device; and receiving the fourth pairing information and fifth pairing information indicating that the fourth device is a peer device to perform pairing, from the fourth device.

The fourth pairing information may include fourth Push Button Configuration (PBC) information indicating that a button for instructing to perform pairing has been pushed in the third device, and a media access control (MAC) address of the third device, and the fifth pairing information may include fifth PBC information indicating that a button for instructing to perform pairing has been pushed in the fourth device, and a MAC address of the fourth device.

According to an aspect of another exemplary embodiment, there is provided a method of performing pairing between a third device and a fourth device that do not belong to any network, the method including: transmitting fourth pairing information indicating that the third device is a device to perform pairing, to the fourth device; receiving an association request to associate with the third device, from the fourth device; transmitting an association response that approves the association request, to the fourth device; and receiving the fourth pairing information and fifth pairing information indicating that the fourth device is a peer device to perform pairing, from the fourth device.

The method may further include deciding a device to become a coordinator through negotiation between the third device and the fourth device.

The method may further include performing negotiation between the third device and the fourth device whether a Personal Basic Service Set (PBSS) network or an Independent Basic Service Set (IBSS) is to be established, between the third device and the fourth device, so as to establish the PBSS network.

The method may further include performing negotiation between the third device and the fourth device whether a Personal Basic Service Set (PBSS) network or an Independent Basic Service Set (IBSS) is to be established, between the third device and the fourth device, so as to establish the IBSS network.

According to an aspect of another exemplary embodiment, there is provided a method of performing pairing between a third device and a fourth device that do not belong to any network, the method including: transmitting fourth pairing information indicating that the third device is a device to perform pairing, to the fourth device, wherein the transmitting of the fourth pairing information is performed by the third device; transmitting the fourth pairing information and fifth pairing information indicating that the fourth device is a peer device to perform pairing, to the third device, wherein the transmitting of the fourth pairing information and the fifth pairing information is performed by the fourth device; deciding a device to become a coordinator through negotiation between the third device and the fourth device; and associating the fourth device with the third device based on a decision.

The associating the fourth device with the third device may include: transmitting an association request to associate with the third device, wherein the transmitting of the association request is performed by the fourth device; and transmitting an association response that approves the association request, to the third device.

According to an aspect of another exemplary embodiment, there is provided a coordinator for performing pairing between the coordinator and a device that does not belong to any network and for belonging to a predetermined network, the coordinator including: a transmitting unit broadcasting a beacon including first pairing information indicating that the coordinator is a device to perform pairing, or the first pairing information; and a receiving unit receiving second pairing information indicating that the device is a peer device to perform pairing, from the device, wherein the device transmits the second pairing information to the coordinator after the device associates with the predetermined network or while the device associates with the predetermined network.

According to an aspect of another exemplary embodiment, there is provided a coordinator belonging to a predetermined network and performing pairing between a first device that does not belong to any network and a second device that belongs to the predetermined network, the coordinator including: a receiving unit receiving third pairing information indicating that the second device is a device to perform pairing, from the second device; and a transmitting unit relaying third pairing information to the first device, wherein the receiving unit further receives second pairing information indicating that the first device is a peer device to perform pairing, from the first device, and the transmitting unit further broadcasts a beacon including the second pairing information and the third pairing information, or the second pairing information and the third pairing information, and the first device transmits the second pairing information to the coordinator after the first device associates with the predetermined network or while the first device associates with the predetermined network.

According to an aspect of another exemplary embodiment, there is provided a network system including a first device that does not belong to any network and a second device that belongs to a first network and performs pairing between the second device and the first device, the network system including: the first device becoming a coordinator of a second network after establishing the second network and then broadcasting a beacon including second pairing information indicating that the first device is a device to perform pairing, or the second pairing information; and the second device disassociating the second device from the first network, transmitting third pairing information indicating that the second device is a peer device to perform pairing, to the first device and associating the second device with the second network.

According to an aspect of another exemplary embodiment, there is provided a network system including a first device that does not belong to any network and a second device that belongs to a first network and performs pairing between the second device and the first device, the network system including: the second device becoming a coordinator of a second network after establishing the second network at a channel different from a channel that communicates with a coordinator of the first network and then broadcasting a beacon including third pairing information indicating that the second device is a device to perform pairing, or the third pairing information, wherein the broadcasting of the beacon or the third pairing information is performed by the second device; and the first device transmitting second pairing information indicating that the first device is a peer device to perform pairing, to the second device, wherein, after the second device disassociates from the first network, the second device associates with the second network.

According to an aspect of another exemplary embodiment, there is provided an apparatus for performing pairing between a third device and a fourth device that do not belong to any network, the apparatus including: a controlling unit establishing a third network and controlling the apparatus so that the third device becomes a coordinator of the third network; a transmitting unit broadcasting a beacon including fourth pairing information indicating that the third device is a device to perform pairing, or the fourth pairing information; and a receiving unit receiving an association request to associate with the third network, from the fourth device, wherein the transmitting unit further transmits an association response that approves the association request, to the fourth device, and the receiving unit further receives the fourth pairing information and fifth pairing information indicating that the fourth device is a peer device to perform pairing, from the fourth device.

According to an aspect of another exemplary embodiment, there is provided an apparatus for performing pairing between a third device and a fourth device that do not belong to any network, the apparatus including: a transmitting unit transmitting fourth pairing information indicating that the third device is a device to perform pairing, to the fourth device; and a receiving unit receiving an association request to associate with the third device, from the fourth device, wherein the transmitting unit further transmits an association response that approves the association request, to the fourth device, and the receiving unit further receives the fourth pairing information and fifth pairing information indicating that the fourth device is a peer device to perform pairing, from the fourth device.

According to an aspect of another exemplary embodiment, there is provided a network system including a third device that does not belong to any network and a fourth device that does not belong to any network and performs pairing between the third device and the fourth device, the network system including: the third device transmitting fourth pairing information indicating that the third device is a device to perform pairing, to the fourth device; and the fourth device transmitting the fourth pairing information and fifth pairing information indicating that the fourth device is a peer device to perform pairing, to the third device, wherein, after each of the third device and the fourth device decide a device to become a coordinator through negotiation between the third device and the fourth device, the fourth device associates with the third device based on a decision.

According to an aspect of another exemplary embodiment, there is provided a computer-readable recording medium having recorded thereon a computer program for executing the method of performing pairing between a coordinator that belongs to a predetermined network and a device that does not belong to any network, the method including: broadcasting a beacon including first pairing information indicating that the coordinator is a device to perform pairing, or the first pairing information; and receiving second pairing information indicating that the device is a peer device to perform pairing, from the device, wherein the device transmits the second pairing information to the coordinator after the device associates with the predetermined network or while the device associates with the predetermined network.

According to an aspect of another exemplary embodiment, there is provided a computer-readable recording medium having recorded thereon a computer program for executing the method of performing pairing between a first device that does not belong to any network and a second device that belongs to a predetermined network, by using a coordinator that belongs to the predetermined network, the method including: relaying third pairing information indicating that the second device is a device to perform pairing, from the second device to the first device; receiving second pairing information indicating that the first device is a peer device to perform pairing, from the first device; and broadcasting a beacon including the second pairing information and the third pairing information, or the second pairing information and the third pairing information, wherein the first device transmits the second pairing information to the coordinator after the first device associates with the predetermined network or while the first device associates with the predetermined network.

According to an aspect of another exemplary embodiment, there is provided a computer-readable recording medium having recorded thereon a computer program for executing the method of performing pairing between a first device that does not belong to any network and a second device that belongs to a first network, the method including: the first device becoming a coordinator of a second network after establishing the second network; broadcasting a beacon including second pairing information indicating that the first device is a device to perform pairing, or the second pairing information, wherein the broadcasting of the beacon or the second pairing information is performed by the first device; disassociating the second device from the first network; transmitting third pairing information indicating that the second device is a peer device to perform pairing, to the first device, wherein the transmitting of the third pairing information is performed by the second device; and associating the second device with the second network.

According to an aspect of another exemplary embodiment, there is provided a computer-readable recording medium having recorded thereon a computer program for executing the method of performing pairing between a first device that does not belong to any network and a second device that belongs to a first network, the method including: the second device becoming a coordinator of a second network after establishing the second network at a channel different from a channel that communicates with a coordinator of the first network; broadcasting a beacon including third pairing information indicating that the second device is a device to perform pairing, or the third pairing information, wherein the broadcasting of the beacon or the third pairing information is performed by the second device; transmitting second pairing information indicating that the first device is a peer device to perform pairing, to the second device, wherein the transmitting of the second pairing information is performed by the first device; disassociating the second device from the first network; and associating the first device with the second network.

According to an aspect of another exemplary embodiment, there is provided a computer-readable recording medium having recorded thereon a computer program for executing the method of performing pairing between a third device and a fourth device that do not belong to any network, the method including: the third device becoming a coordinator of a third network after establishing the third network; broadcasting a beacon including fourth pairing information indicating that the third device is a device to perform pairing, or the fourth pairing information, wherein the broadcasting of the beacon or the fourth pairing information is performed by the third device; receiving an association request to associate with the third network, from the fourth device; transmitting an association response that approves the association request, to the fourth device; and receiving the fourth pairing information and fifth pairing information indicating that the fourth device is a peer device to perform pairing, from the fourth device.

According to an aspect of another exemplary embodiment, there is provided a computer-readable recording medium having recorded thereon a computer program for executing the method of performing pairing between a third device and a fourth device that do not belong to any network, the method including: transmitting fourth pairing information indicating that the third device is a device to perform pairing, to the fourth device; receiving an association request to associate with the third device, from the fourth device; transmitting an association response that approves the association request, to the fourth device; and receiving the fourth pairing information and fifth pairing information indicating that the fourth device is a peer device to perform pairing, from the fourth device.

According to an aspect of another exemplary embodiment, there is provided a computer-readable recording medium having recorded thereon a computer program for executing the method of performing pairing between a third device and a fourth device that do not belong to any network, the method including: transmitting fourth pairing information indicating that the third device is a device to perform pairing, to the fourth device, wherein the transmitting of the fourth pairing information is performed by the third device; transmitting the fourth pairing information and fifth pairing information indicating that the fourth device is a peer device to perform pairing, to the third device, wherein the transmitting of the fourth pairing information and the fifth pairing information is performed by the fourth device; deciding a device to become a coordinator through negotiation between the third device and the fourth device; and associating the fourth device with the third device based on a decision.

According to an aspect of another exemplary embodiment, there is provided a computer-readable recording medium having recorded thereon a computer program for executing the method of performing pairing between the coordinator and a device that does not belong to any network and for belonging to a predetermined network, the coordinator including: a transmitting unit broadcasting a beacon including first pairing information indicating that the coordinator is a device to perform pairing, or the first pairing information; and a receiving unit receiving second pairing information indicating that the device is a peer device to perform pairing, from the device, wherein the device transmits the second pairing information to the coordinator after the device associates with the predetermined network or while the device associates with the predetermined network.

BRIEF DESCRIPTION OF THE DRAWINGS

The above and other aspects will become more apparent by describing in detail exemplary embodiments with reference to the attached drawings in which.

DETAILED DESCRIPTION OF EXEMPLARY EMBODIMENTS

Exemplary embodiments will now be described more fully with reference to the accompanying drawings. Expressions such as "at least one of," when preceding a list of elements, modify the entire list of elements and do not modify the individual elements of the list.

Figure 1:
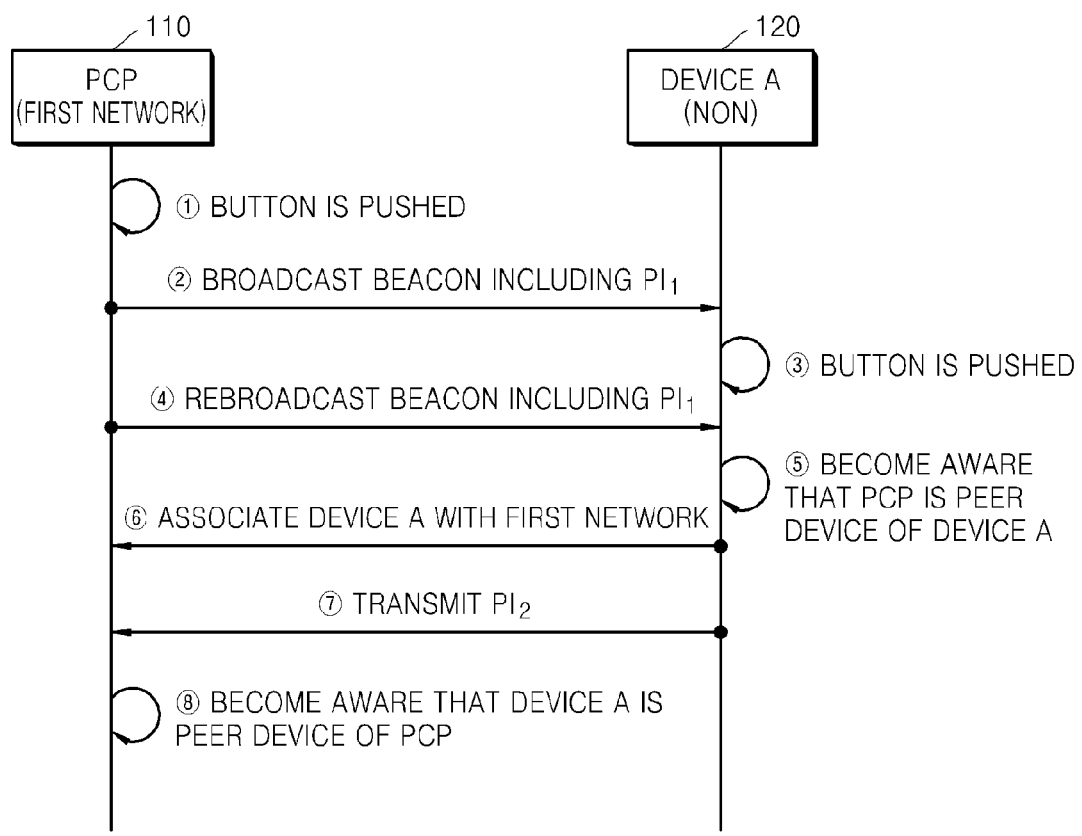
FIG. 1 is a flowchart illustrating a method of performing pairing between a coordinator and a device, according to an exemplary embodiment.

FIG. 1 is a flowchart illustrating a method of performing pairing between a coordinator and a device, according to an exemplary embodiment.

Hereinafter, it is assumed that a network to which a coordinator or a device belongs is referred to as a Personal Basic Service Set (PBSS) network. The PBSS network refers to a network in which direct communication between devices is basically performed without a coordinator corresponding to an access point (AP) of a Basic Service Set (BSS) network. The coordinator may be referred to as a PBSS Control Point (PCP). In the following drawings, the coordinator is indicated by PCP.

The difference between the BSS network and the PBSS network is that, in the BSS network, an AP and devices are clearly differentiated from each other, such that a device to be used as an AP and a device to be used as a device in a network can be determined. However, in the PBSS network, devices can also operate as a PCP, such that it is relatively more difficult to differentiate a device to be used as a PCP and a device to be used as a device in a network from each other.

In addition, the PBSS network may be considered a similar network to a Wireless Personal Area Network (WPAN) system. Unlike the WPAN system that is not connected to an external network, the PBSS network may be connected to the external network. In addition, the PBSS network may support communication in a 60 GHz frequency band.

Also, FIG. 1 illustrates a PCP 110 that belongs to a first network, and a device A 120 that does not belong to any network. For convenience of explanation, devices that belong to the first network are omitted. In addition, the indication "first network" in the following drawings represents that a device belongs to the first network, and the indication "NON" represents that a device does not belong to any network.

In a first operation, a button for instructing to perform pairing is pushed by a user of the PCP 110.

In a second operation, the PCP 110 broadcasts a beacon including first pairing information $PI_1$ indicating that the PCP 110 is a device to perform pairing.

In this case, the device A 120 receives the broadcasted beacon from the PCP 110 but ignores the received beacon because a button for instructing to perform pairing is not pushed in the device A 120. Thus, the device A 120 does not respond to the beacon received from the PCP 110.

In addition, although FIG. 1 illustrates a case where the beacon including first pairing information $PI_1$ is broadcasted to only the device A 120 for convenience of explanation, it is understood that the beacon is broadcasted to all devices, including a device that belong to the PBSS network.

In this regard, the PCP 110 may also broadcast the first pairing information $PI_1$ instead of the beacon including first pairing information $PI_1$.

In addition, the first pairing information $PI_1$ may include at least one of first Push Button Configuration (PBC) information indicating that the button for instructing to perform pairing has been pushed in the PCP 110, a media access control (MAC) address of the PCP 110, an identifier regarding the first network that is a network to which the PCP 110 belongs, etc.

In addition, the first pairing information $PI_1$ may further include PCP role information indicating that the PCP 110 acts as PCP.

In another exemplary embodiment, instead of broadcasting the beacon including first pairing information $PI_1$, the PCP 110 may broadcast the first pairing information $PI_1$ in one time period from among time periods in which data communication between the PCP 110 and the device A 120 is performed, or may broadcast the first pairing information $PI_1$ in an announcement time period for notifying information in the first network.

In a third operation, a button for instructing to perform pairing is pushed by a user of the device A 120.

In this way, if the button for instructing to perform pairing is pushed in the device A 120, the device A 120 can respond to the beacon received from the PCP 110. In other words, the device A 120 accepts the received beacon as meaningful information if the beacon is received after the button for instructing to perform pairing has been pushed in the device A 120.

In a fourth operation, the PCP 110 rebroadcasts the beacon including first pairing information $PI_1$.

Although FIG. 1 illustrates a case where the beacon including first pairing information $PI_1$ is transmitted twice, i.e., in the second operation and in the fourth operation, it is understood that another exemplary embodiment is not limited thereto, and the beacon may be broadcasted periodically any number of times according to another exemplary embodiment.

In a fifth operation, the device A 120 that receives the first pairing information $PI_1$ from the PCP 110 becomes aware that the PCP 110 is a peer device of the device A 120.

In a sixth operation, the device A 120 associates with the first network.

For example, the device A 120 transmits to the PCP 110 an association request to associate with the first network and receives from the PCP 110 an association response that approves the association request and thereby may associate with the first network.

In this regard, the device A 120 associates with the first network because, if the PCP 110 and the device A 120 do not belong to the same network, data cannot be transmitted between the PCP 110 and the device A 120 even though pairing between the PCP 110 and the device A 120 has been completed.

In a seventh operation, the device A 120 transmits second pairing information $PI_2$ indicating that the device A 120 is a peer device to perform pairing, to the PCP 110.

In this regard, the second pairing information $PI_2$ may include at least one of second PBC information indicating that the button for instructing to perform pairing has been pushed in the device A 120, and a MAC address of the device A 120.

In an eighth operation, the PCP 110 that receives the second pairing information $PI_2$ from the device A 120 becomes aware that that the device A 120 is a peer device of the PCP 110.

If the PCP 110 and the device A 120 become aware that they are devices to be paired with each other in the first through eighth operations, pairing between the PCP 110 and the device A 120 is completed. Since the PCP 110 and the device A 120 of which a pairing therebetween is completed belong to the same network, data can be transmitted between the PCP 110 and the device A 120.

If the PCP 110 and the device A 120 belong to the same network but pairing therebetween is not completed or if pairing between the PCP 110 and the device A 120 is completed but the PCP 110 and the device A 120 do not belong to the same network, data cannot be transmitted between the PCP100 and the device A 120.

Although a method of performing pairing between devices by using a Push Button method according to an exemplary embodiment has been described with reference to FIG. 1, it is understood that another exemplary embodiment is not limited to this. For example, the user may also instruct to perform pairing to each of the PCP 110 and the device A 120 by using a remote controller.

Figure 2:
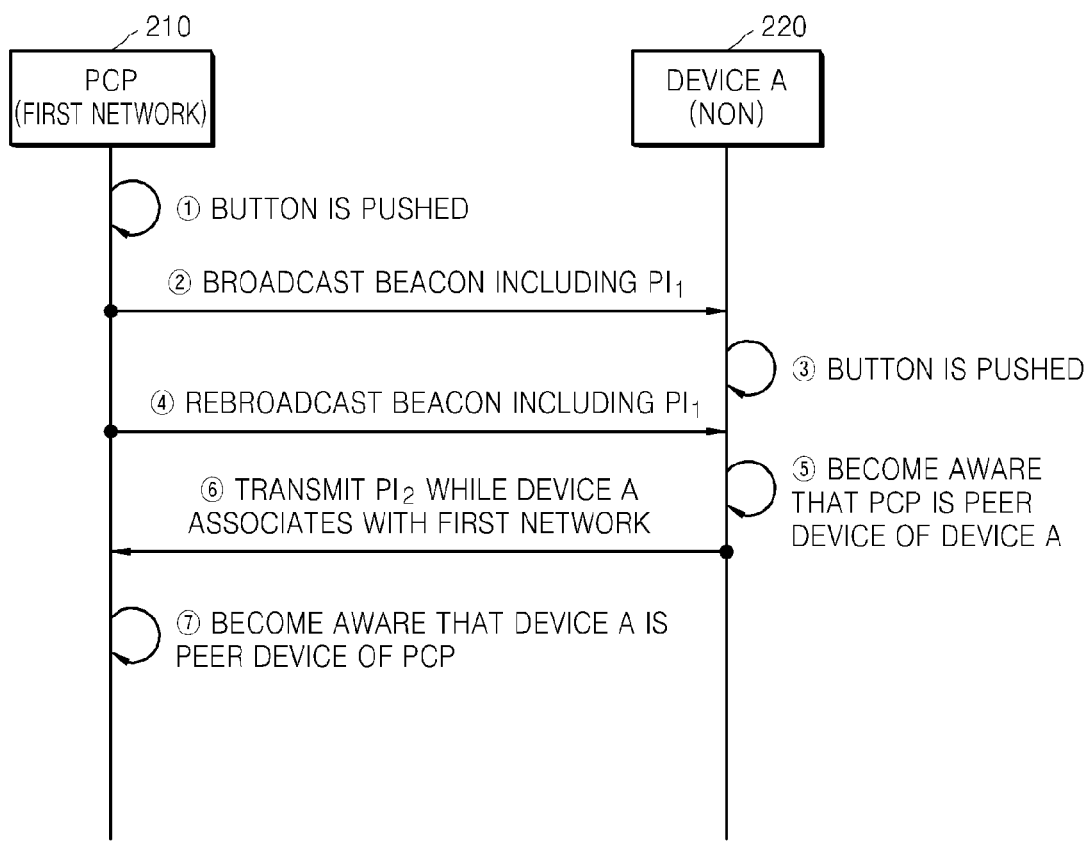
FIG. 2 is a flowchart illustrating a method of performing pairing between a coordinator and a device, according to another exemplary embodiment.

FIG. 2 is a flowchart illustrating a method of performing pairing between a coordinator and a device, according to another exemplary embodiment.

First through fifth operations illustrated in FIG. 2 are the same as those of FIG. 1, and thus, a description thereof is not provided here.

In a sixth operation, a device A 220 transmits second pairing information $PI_2$ to a PCP 210 while associating with a first network.

For example, the device A 220 transmits to the PCP 210 an association request that includes the second pairing information $PI_2$ to associate with the first network and receives from the PCP 210 an association response that approves the association request. Thus, the device A 220 may associate with the first network and simultaneously may transmit the second pairing information $PI_2$ to the PCP 210.

In a seventh operation, the PCP 210 that receives the second pairing information $PI_2$ from the device A 220 becomes aware that the device A 220 is a peer device of the PCP 210.

Methods of performing pairing between a PCP and a device according to exemplary embodiments have been described above. As described above, since pairing is automatically performed by sequentially selecting two devices to be paired, without differentiating whether devices are PCPs or general devices or without the need of being aware that the PCP or device belongs to a predetermined network, pairing between devices can be easily performed.

Figure 3:
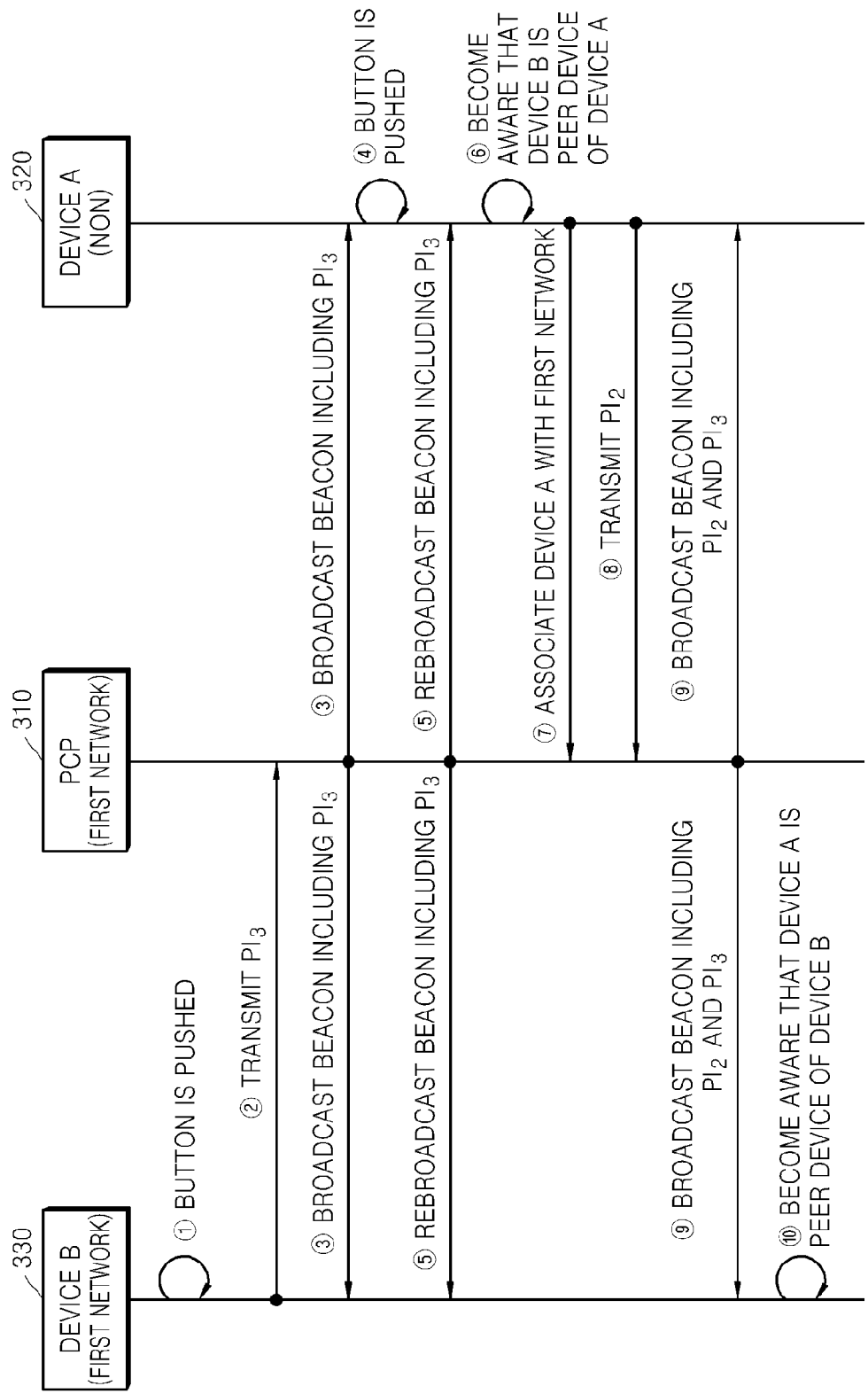
FIG. 3 is a flowchart illustrating a method of performing pairing between devices through a coordinator, according to an exemplary embodiment.

FIG. 3 is a flowchart illustrating a method of performing pairing between devices through a coordinator, according to an exemplary embodiment.

In a first operation, a button for instructing to perform pairing is pushed by a user of a device B330.

In a second operation, the device B 330 transmits third pairing information $PI_3$ indicating that the device B 330 is a device to perform pairing, to a PCP 310.

In this regard, the third pairing information $PI_3$ may include at least one of third PBC information indicating that the button for instructing to perform pairing has been pushed in the device B 330, and a MAC address of the device B 330.

In a third operation, the PCP310 broadcasts a beacon including the third pairing information $PI_3$.

As described above, according to another exemplary embodiment, the PCP310 may broadcast the third pairing information $PI_3$ in other time periods instead of broadcasting the beacon including the third pairing information $PI_3$ in a beacon period. Hereinafter, it is assumed that, even though there is no additional description, an operation of broadcasting the beacon including pairing information in the beacon period may be replaced with an operation of broadcasting pairing information in a predetermined time period.

In a fourth operation, a button for instructing to perform pairing is pushed by a user of a device A 320.

In a fifth operation, the PCP310 rebroadcasts the beacon including the third pairing information $PI_3$.

In this regard, since the button for instructing to perform pairing is pushed in the device A 320, the device A320 can respond to the beacon received from the PCP310.

In a sixth operation, the device A320 becomes aware that the device B330 is a peer device of the device A320.

In a seventh operation, the device A320 associates with a first network.

In an eighth operation, the device A320 transmits second pairing information $PI_2$ indicating that the device A 320 is a peer device to perform pairing, to the PCP 310.

In a ninth operation, the PCP310 broadcasts a beacon including the second pairing information PI2 and the third pairing information PI3.

In a tenth operation, the device B 330 that receives the second pairing information $PI_2$ and the third pairing information $PI_3$ becomes aware that the device A 320 is a peer device of the device B 330.

Figure 4:
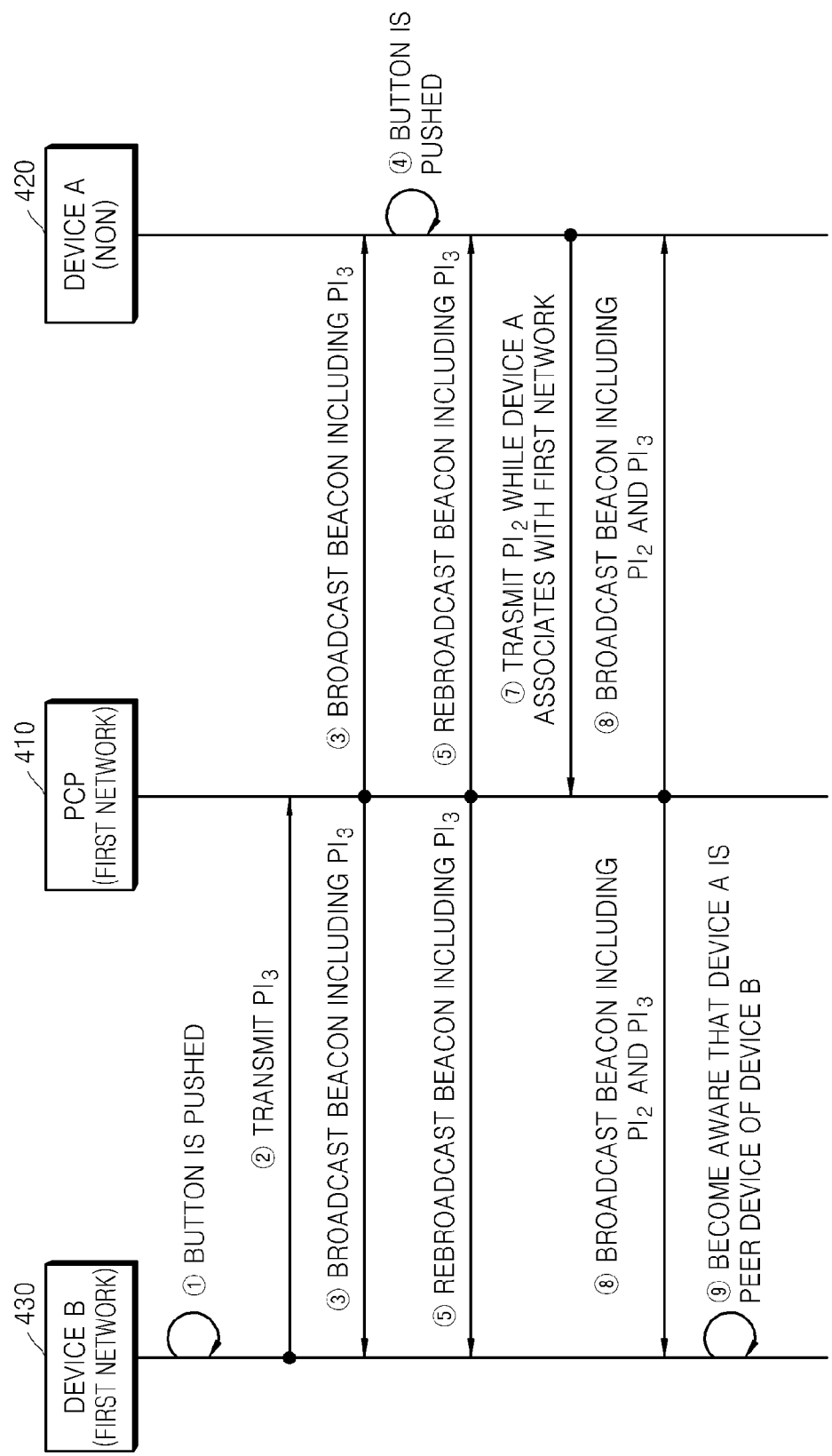
FIG. 4 is a flowchart illustrating a method of performing pairing between devices through a coordinator, according to another exemplary embodiment.

FIG. 4 is a flowchart illustrating a method of performing pairing between devices through a coordinator, according to another exemplary embodiment.

First through sixth operations illustrated in FIG. 4 are the same as those of FIG. 3, and thus, a description thereof is not provided here.

In a seventh operation, a device A 420 transmits the second pairing information $PI_2$ to a PCP410 while associating with a first network.

For example, the device A420 transmits an association request that includes the second pairing information $PI_2$ to associate with the first network to the PCP 410 and receives an association response that approves the association request, from the PCP410. Thus, the device A 420 may associate with the first network and simultaneously may transmit the second pairing information $PI_2$ to the PCP410.

In an eighth operation, the PCP410 broadcasts a beacon including the second pairing information PI2 and the third pairing information PI3.

In the ninth operation, the device B430 becomes aware that the device A420 is a peer device of the device B 430.

In the exemplary embodiments described above with reference to FIGS. 1 through 4, the device A120, 220, 320, or 420 receives the beacon from the PCP 110, 210, 310, or 410 within a predetermined amount of time. However, it is understood that another exemplary embodiment is not limited thereto. For example, in another exemplary embodiment, the device A120, 220, 320, or 420 may not receive the beacon from the PCP 110, 210, 310, or 410 within a predetermined amount of time. An operation of the device A 120, 220, 320, or 420 for the case where device A120, 220, 320, or 420 may not receive the beacon from the PCP 110, 210, 310, or 410 within a predetermined amount of time according to an exemplary embodiment is described as follows with reference to FIG. 5.

Figure 5:
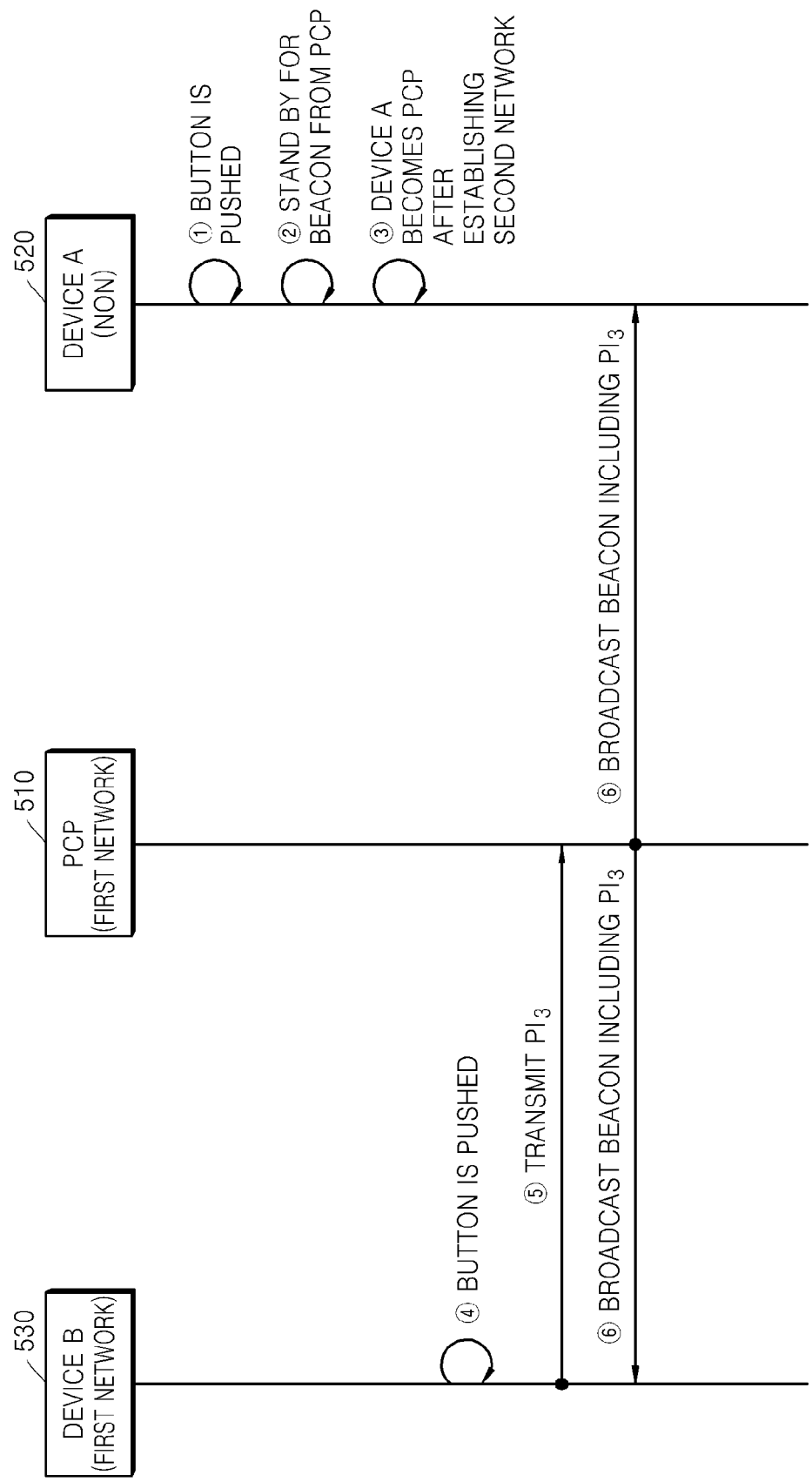
FIG. 5 is a flowchart for explaining an operation of a device that does not listen to a beacon from a coordinator within a predetermined amount of time, according to an exemplary embodiment.

FIG. 5 is a flowchart for explaining an operation of a device that does not listen to a beacon from a coordinator within a predetermined amount of time, according to an exemplary embodiment.

In a first operation, a button for instructing to perform pairing is pushed by a user of a device A520.

In a second operation, the device A 520 stands by for a beacon from a PCP510.

In a third operation, if the device A 520 does not receive the beacon from the PCP510 within a predetermined amount of time, the device A 520 becomes a coordinator of a second network after establishing the second network.

In a fourth operation, a button for instructing to perform pairing is pushed by a user of a device B530.

In a fifth operation, the device B530 transmits third pairing information $PI_3$ indicating that the device B 530 is a device to perform pairing, to the PCP 510.

In a sixth operation, the PCP 510 broadcasts a beacon including the third pairing operation $PI_3$.

In the present exemplary embodiment of FIG. 5, a pairing operation between the deviceB530 and the device A 520 that becomes a coordinator of the second network has not been described and thus will now be described with reference to FIG. 6.

Figure 6:
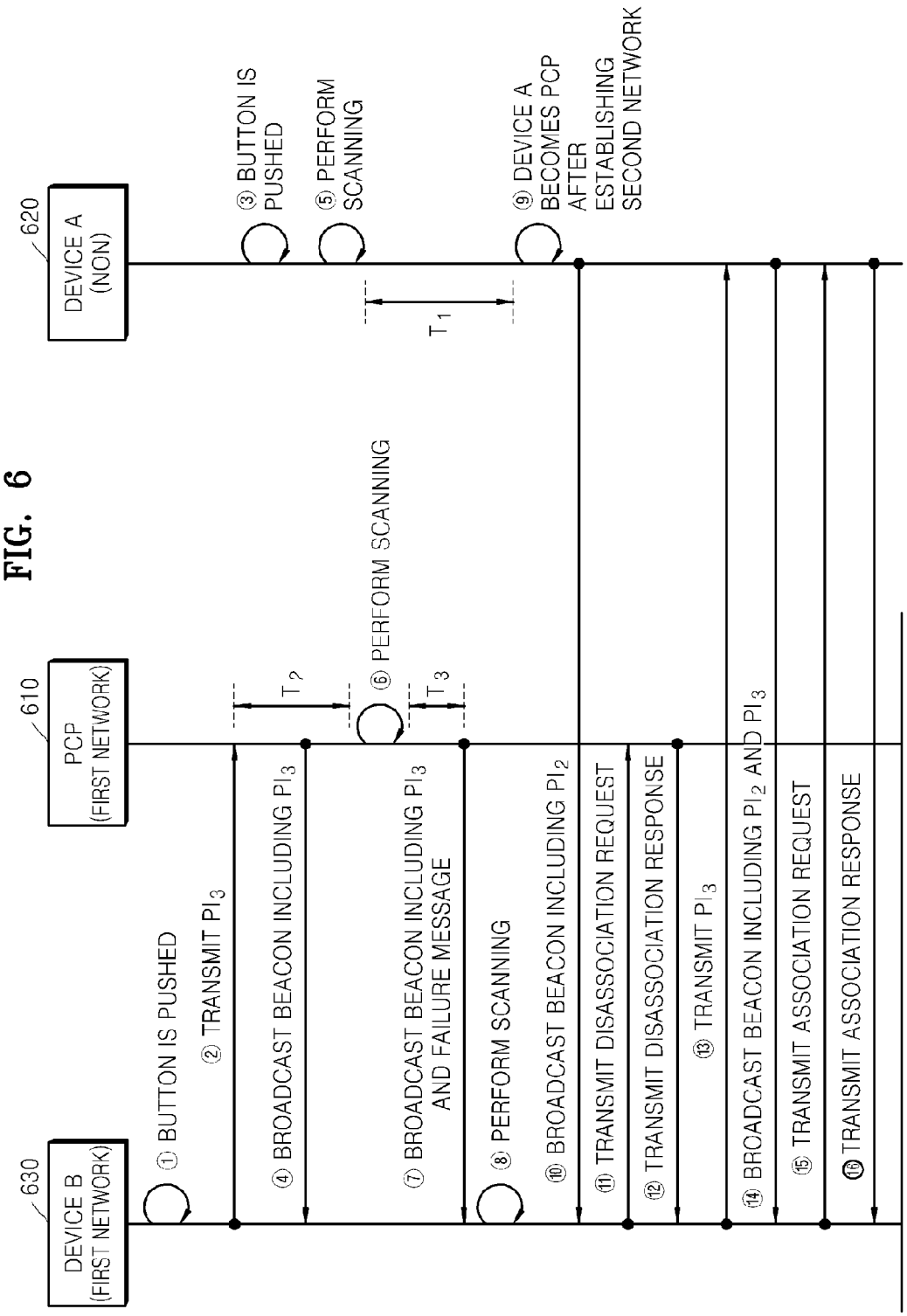
FIG. 6 is a flowchart illustrating a method of performing pairing between devices through a coordinator, according to another exemplary embodiment.

FIG. 6 is a flowchart illustrating a method of performing pairing between devices through a coordinator, according to another exemplary embodiment.

In a first operation, a button for instructing to perform pairing is pushed by a user of a device B630.

In a second operation, the device B 630 transmits third pairing information $PI_3$ indicating that the device B 630 is a device to perform pairing, to a PCP 610.

In a third operation, a button for instructing to perform pairing is pushed by a user of a device A620.

In a fourth operation, the PCP610 broadcasts a beacon including the third pairing information $PI_3$.

In this regard, the third pairing information $PI_3$ broadcasted by the PCP 610 is received only by the device B630 and is not received by the device A 620. For example, a distance between the PCP610 and the device A 620 is far so that the device A 620 may not receive the broadcasted third pairing information PI$_3$ from the PCP610.

In a fifth operation, the device A 620 scans a message from the PCP 610 for a first critical time.

In another exemplary embodiment, the device A620 may also request to transmit pairing information or a beacon to all peripheral devices around the device A 620.

In a sixth operation, the message from the device A 620 is scanned for a third critical time starting from the time when a second critical time has elapsed from the time when the PCP610 has received the third pairing information PI$_3$ from the device B 630.

In a seventh operation, when the PCP610 does not receive any message from the device A 620 after the message from the device A 620 is scanned for the third critical time, the PCP 610 broadcasts a beacon including the third pairing information PI$_3$ and a failure message.

In an eighth operation, the device B 630 scans a channel different from a channel for communicating with the PCP610.

For example, the device B630 scans a message from the device A 620.

In a ninth operation, when the device A 620 does not receive any message from the PCP 610 after the device B 630 scans the message from the device A 620 for the first critical time, the device A 620 becomes a coordinator of a second network after establishing the second network.

In a tenth operation, the device A 620 broadcasts second pairing information PI$_2$ indicating that the device A620 is a device to perform pairing.

In this regard, the second pairing information PI$_2$ broadcasted by the device A 620 is received by the device B630 and is not received by the PCP610.

In an eleventh operation, the device B 630 transmits a disassociation request to disassociate from the first network to the PCP610.

In a twelfth operation, the PCP610 transmits to the device B 630 a disassociation response that approves the disassociation request. Thus, the device B 630 disassociates from the first network.

In a thirteenth operation, the device B 630 transmits the third pairing information PI$_3$ to the device A 620.

In a fourteenth operation, the device A 620 broadcasts a beacon including the second pairing information PI2 and the third pairing information PI$_3$.

In this regard, the second pairing information PI$_2$ and the third pairing information PI$_3$ broadcasted by the device A 620 are received only by the device B 630 and are not received by the PCP610.

In a fifteenth operation, the device B 630 transmits an association request to associate with the second network to the device A620.

In a sixteenth operation, the device A 620 transmits an association response that approves the association request, to the device B 630.

Figure 7:
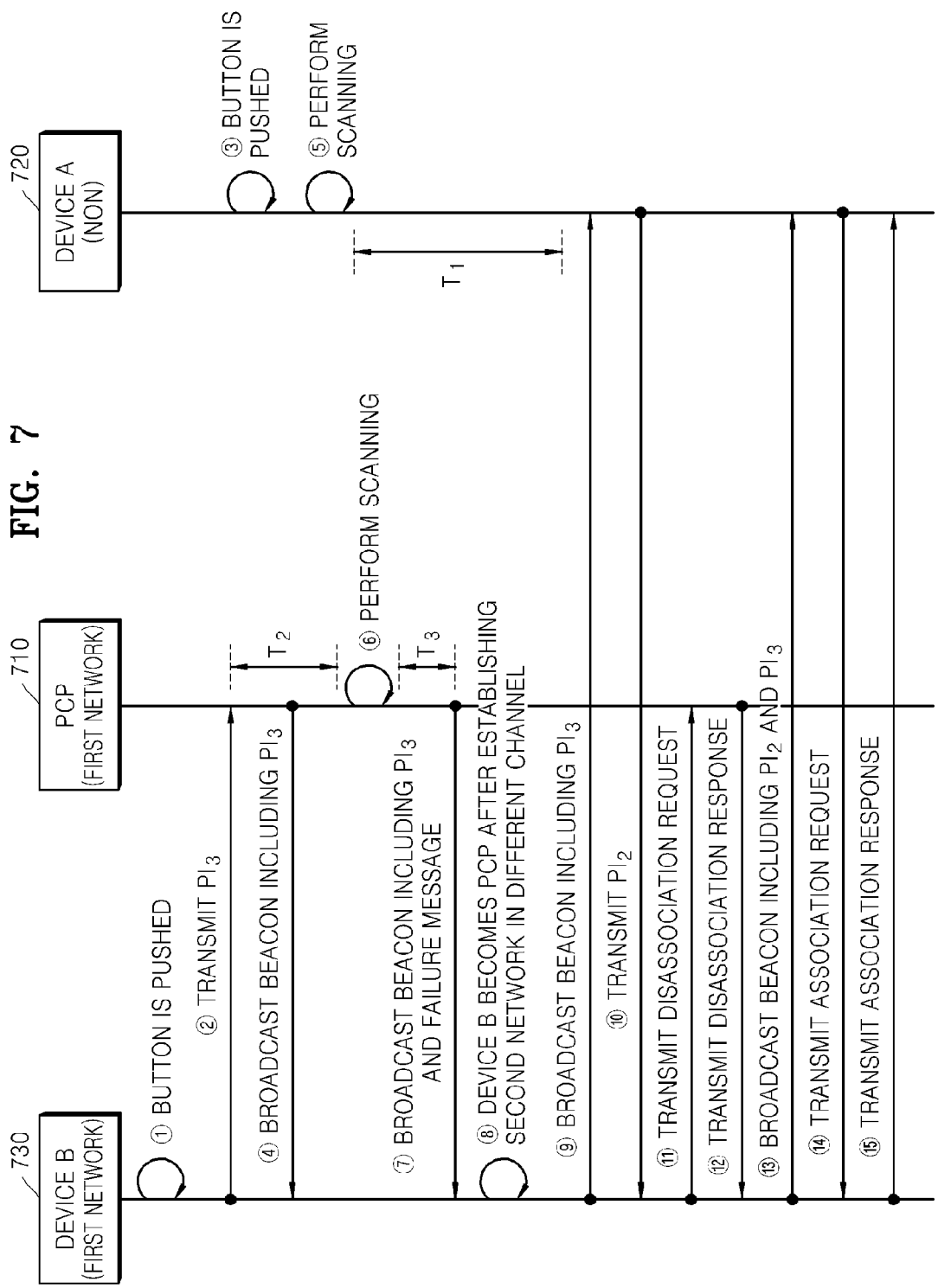
FIG. 7 is a flowchart illustrating a method of performing pairing between devices through a coordinator, according to another exemplary embodiment.

FIG. 7 is a flowchart illustrating a method of performing pairing between devices through a coordinator, according to another exemplary embodiment.

First through seventh operations illustrated in FIG. 7 are the same as those of FIG. 6, and thus, a description thereof is not provided here.

In an eighth operation, when a device B 730 receives a beacon including the third pairing information PI$_3$ and a failure message from a PCP710, the device B 730 becomes a coordinator of a second network after establishing the second network at a channel different from a channel that communicates with the PCP710.

In a ninth operation, the device B 730 broadcasts the third pairing information PI$_3$ indicating that the device B 730 is a device to perform pairing.

In this regard, the third pairing information PI$_3$ broadcasted by the device B 730 is received by a device A 720 and is not received by the PCP 710.

In a tenth operation, the device A 720 transmits to the device B 730 second pairing information PI$_2$ indicating that the device A 720 is a device to perform pairing.

In an eleventh operation, the device B 730 transmits to the PCP 710 a disassociation request to disassociate from the first network.

In a twelfth operation, the PCP710 transmits to the device B 730 a disassociation response that approves the disassociation request. Thus, the device B 730 disassociates from the first network.

In a thirteenth operation, the device B730 broadcasts a beacon including the second pairing information PI$_2$ and the third pairing information PI$_3$.

In this regard, the second pairing information PI$_2$ and the third pairing information PI$_3$ broadcasted by the device B 730 are received by the device A 720 and are not received by the PCP710.

In a fourteenth operation, the device A 720 transmits to the device B 730 an association request to associate with the second network.

In a fifteenth operation, the device B730 transmits to the device A 720 an association response that approves the association request.

In the exemplary embodiments described above with reference to FIGS. 3 through 7, a button is pushed in each device that belongs to a predetermined network and a device that does not belong to any network, so that pairing between two devices can be performed through a coordinator and pairing between devices can be easily performed.

Hereinafter, a method of performing pairing between two devices that do not belong to any network, according to one or more exemplary embodiments, is described.

Figure 8:
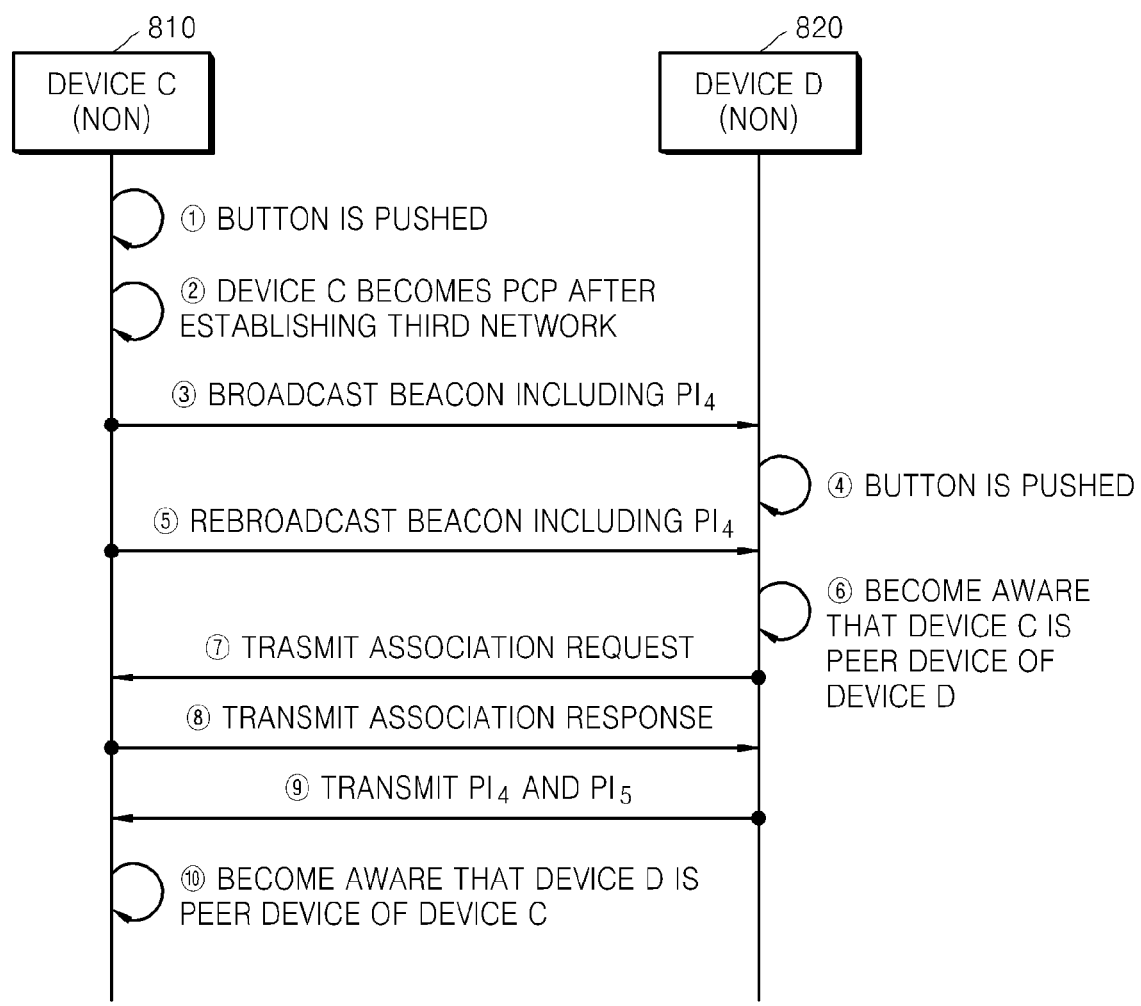
FIG. 8 is a flowchart illustrating a method of performing pairing between devices that do not belong to any network, according to an exemplary embodiment.

FIG. 8 is a flowchart illustrating a method of performing pairing between devices that do not belong to any network, according to an exemplary embodiment.

In a first operation, a button for instructing to perform pairing is pushed by a user of a device C810.

In a second operation, the device C 810 becomes a coordinator of a third network after establishing the third network.

In a third operation, the device C 810 broadcasts a beacon including fourth pairing information PI$_4$ indicating that the device C810 is a device to perform pairing.

In this regard, a device D 820 receives the broadcasted beacon from the device C 810 but ignores the received beacon because a button for instructing to perform pairing is not pushed in the device D 820. Thus, the device D 820 does not respond to the beacon received from the device C 810.

Also, the fourth pairing information PI$_4$ may include at least one of fourth PBC information indicating that the button for instructing to perform pairing has been pushed in the device C 810, and a MAC address of the device C 810.

In a fourth operation, a button for instructing to perform pairing is pushed by the user of the device D 820.

In this way, if the button for instructing to perform pairing is pushed in the device D 820, the device D820 can respond to the beacon received from the device C 810.

In a fifth operation, the device C 810 rebroadcasts the beacon including the fourth pairing information PI$_4$.

In a sixth operation, the device D 820 becomes aware that the device C 810 is a peer device of the device D820.

In a seventh operation, the device D 820 transmits to the device C 810 an association request to associate with the third network.

In an eighth operation, the device C 810 transmits to the device D 820 an association response that approves the association request.

It is understood that, according to another exemplary embodiment, the device D 820 may associate with the third network of the device C 810 differently from transmitting and receiving the association request and the association response like in the seventh operation and in the eighth operation.

In a ninth operation, the device D 820 transmits to the device C 810 the fourth pairing information $PI_4$ and fifth pairing information $PI_5$ indicating that the device D 820 is a peer device to perform pairing.

In this regard, the fifth pairing information $PI_5$ may include at least one of fifth PBC information indicating that the button for instructing to perform pairing has been pushed in the device D820, and a MAC address of the device D 820.

In a tenth operation, the device C 810 becomes aware that the device D820 is a peer device of the device C 810.

Figure 9:
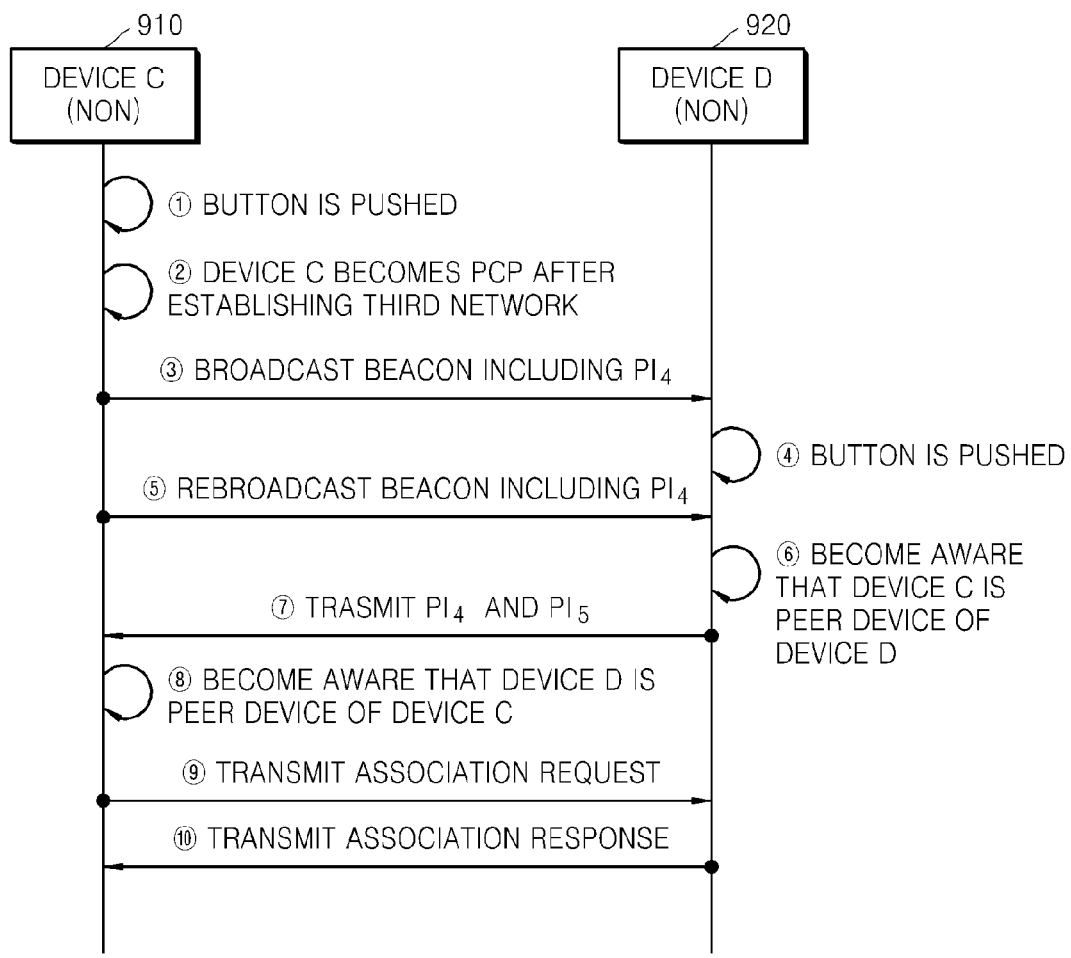
FIG. 9 is a flowchart illustrating a method of performing pairing between devices that do not belong to any network, according to another exemplary embodiment.

FIG. 9 is a flowchart illustrating a method of performing pairing between devices that do not belong to any network, according to another exemplary embodiment.

First through sixth operations illustrated in FIG. 9 are the same as those of FIG. 8, and thus, a description thereof is not provided here.

In a seventh operation, a device D920 transmits to a device C 910 the fourth pairing information $PI_4$ and fifth pairing information $PI_5$.

In an eighth operation, the device C 910 becomes aware that the device D 920 is a peer device of the device C 910.

In a ninth operation, the device D 920 transmits to the C 910 an association request to associate with a third network.

In a tenth operation, the device C910 transmits to the device D 920 an association response that approves the association request.

Figure 10:
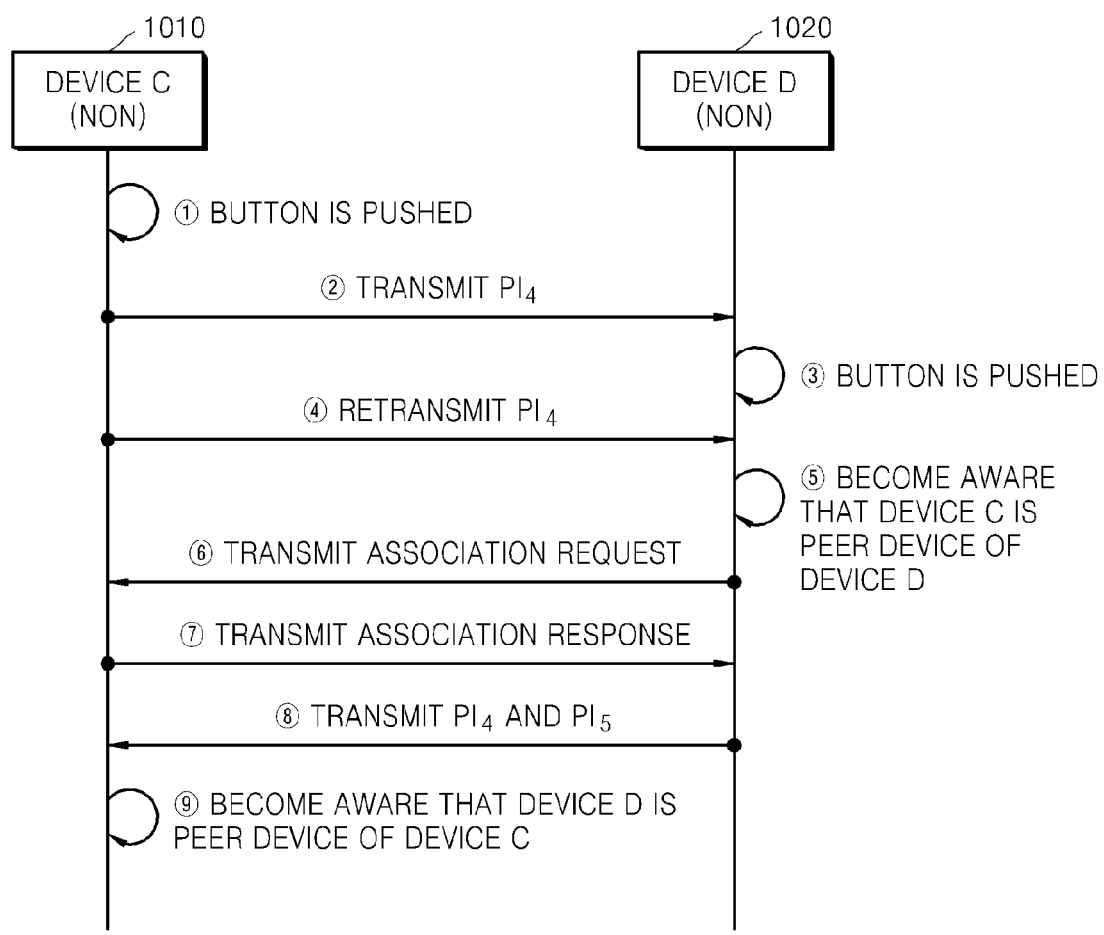
FIG. 10 is a flowchart illustrating a method of performing pairing between devices that do not belong to any network, according to another exemplary embodiment.

FIG. 10 is a flowchart illustrating a method of performing pairing between devices that do not belong to any network, according to another exemplary embodiment.

In a first operation, a button for instructing to perform pairing is pushed by a user of a device C1010.

In a second operation, the device C 1010 transmits to a device D 1020 fourth pairing information $PI_4$ indicating that the device C 1010 is a device to perform pairing.

In a third operation, a button for instructing to perform pairing is pushed by the user of the device D1020.

In a fourth operation, the device C1010 retransmits the fourth pairing information $PI_4$ to the device D1020.

In a fifth operation, the device D 1020 becomes aware that the device C 1010 is a peer device of the device D 1020.

In a sixth operation, the device D 1020 transmits to the device C 1010 an association request to associate with the device C 1010.

In this regard, transmitting of the association request to the device C 1010 by the device D1020 indicates that the device D1020 wants to establish an Independent Basic Service Set (IBSS) network between the device D 1010 and the device C 1020.

In addition, in the current exemplary embodiment, the device D1020 transmits the association request to the device C1010 because the button for instructing to perform pairing is first pushed in the device C1010.

In a seventh operation, the device C 1010 transmits an association response that approves the association request, to the device D 1020.

The device D 1020 receives the association response so that the IBSS network can be established between the device C 1010 and the device D 1020.

In an eighth operation, the device D1020 transmits the fourth pairing information $PI_4$ and fifth pairing information $PI_5$ indicating that the device D 1020 is a peer device to perform pairing, to the device C 1010.

In a ninth operation, the device C 1010 becomes aware that the device D 1020 is a peer device of the device C 1010.

Figure 11:
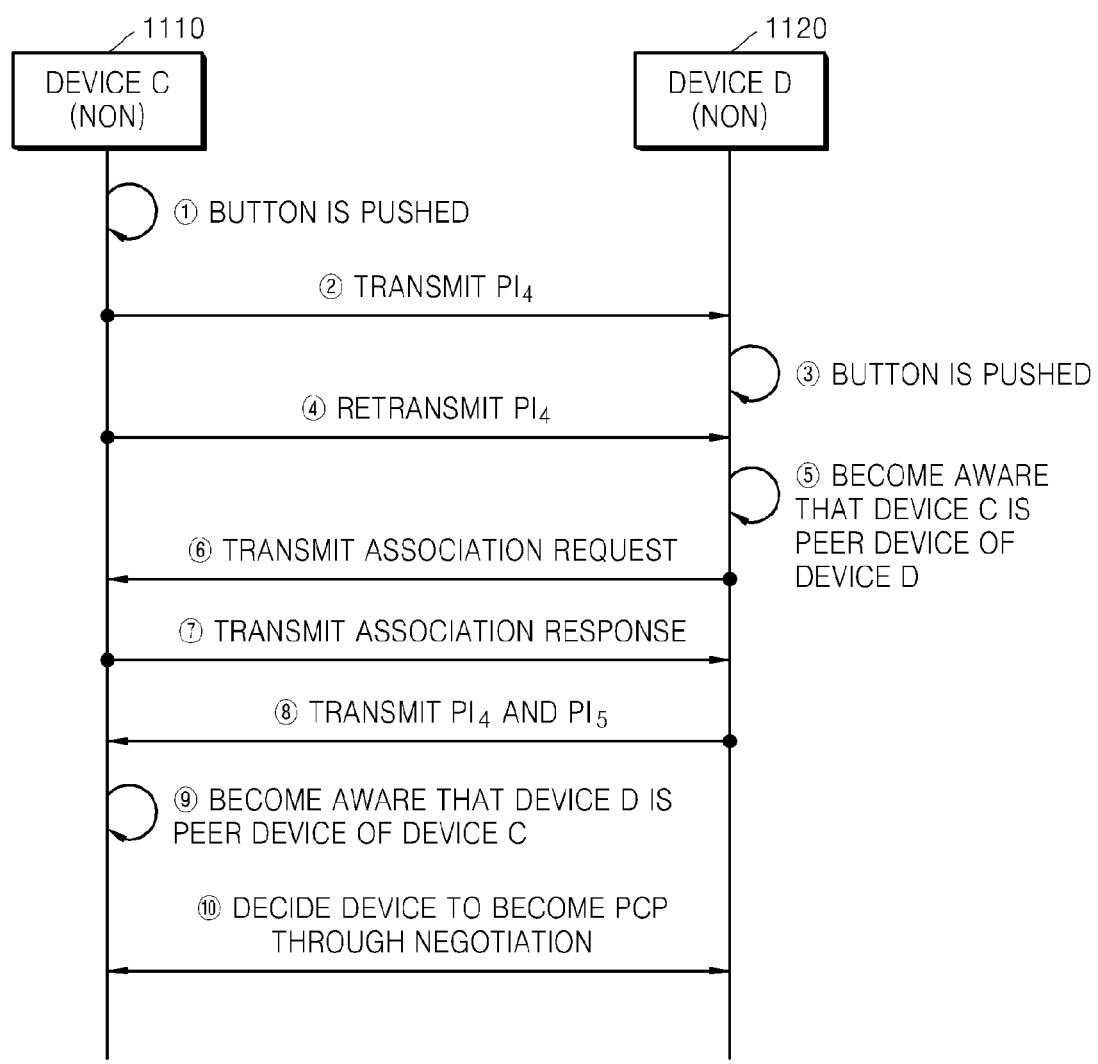
FIG. 11 is a flowchart illustrating a method of performing pairing between devices that do not belong to any network, according to another embodiment of the present invention.

FIG. 11 is a flowchart illustrating a method of performing pairing between devices that do not belong to any network, according to another exemplary embodiment.

First through ninth operations illustrated in FIG. 11 are the same as those of FIG. 10, and thus, a description thereof is not provided here.

In a tenth operation, a device C1110 and a device D1120 decide a device to be a PCP through mutual negotiation.

In this regard, a device having a better capability as a coordinator between the device C 1110 and the device D1120 may be decided as a device to be a PCP. For example, the device to be a PCP may be decided based on at least one of the maximum number of devices controllable by each of the device C 1110 and the device D 1120, the number of devices that belong to each of the device C1110 and the device D1120, and depending on whether power is supplied to each of the device C 1110 and the device D 1120 by using a battery.

Also, since in the seventh operation, the IBSS network has been established between the device C1110 and the device D 1120, if a PCP is decided between the device C 1110 and the device D 1120, the IBSS network is converted into a PBSS network.

In another exemplary embodiment, at least one of the fourth pairing information $PI_4$ and the fifth pairing information $PI_5$ may be included in a message to be transmitted and received when negotiation between the device C 1110 and the device D 1120 is performed, so as to check whether the message is a message transmitted by a peer device.

Figure 12:
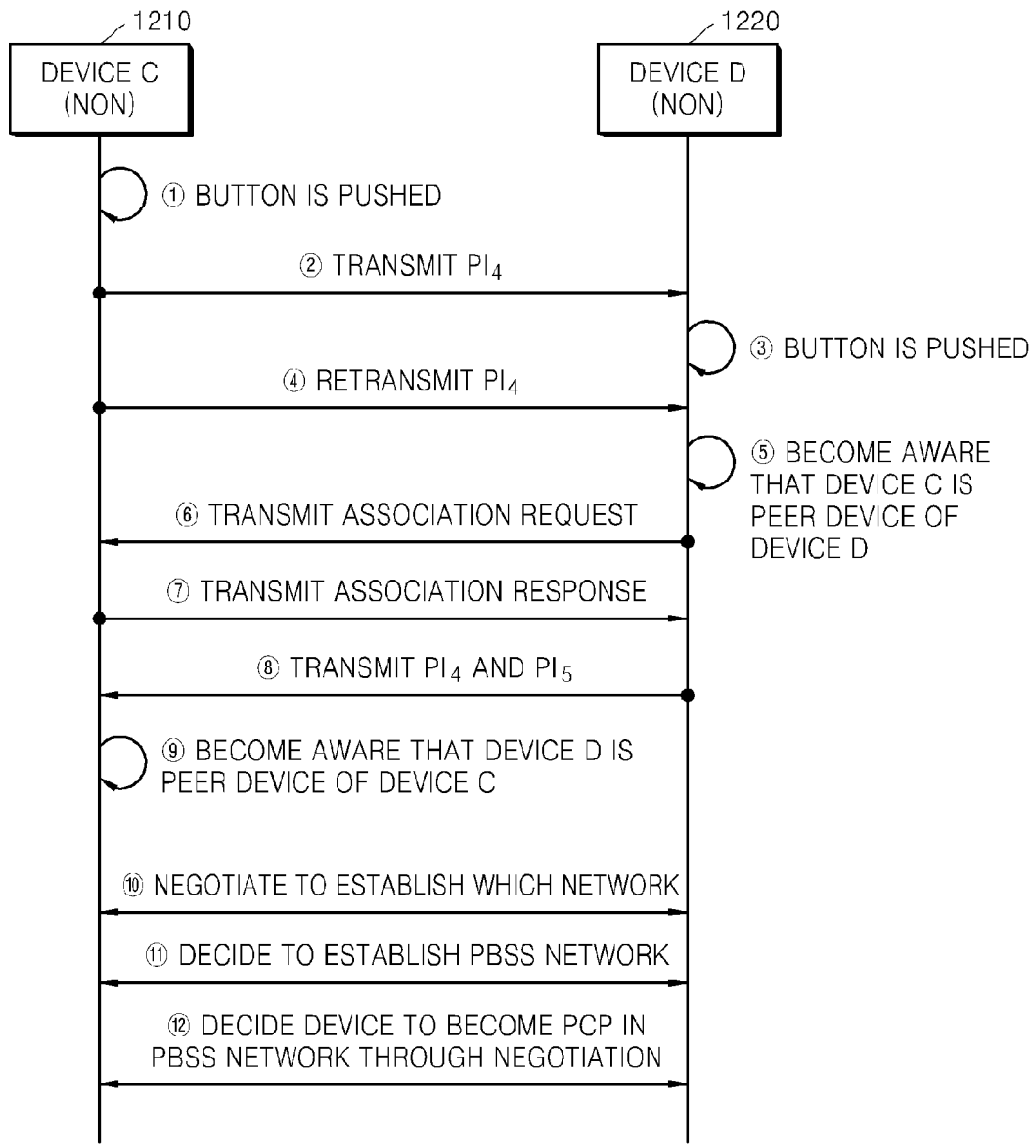
FIG. 12 is a flowchart illustrating a method of performing pairing between devices that do not belong to any network, according to another exemplary embodiment.

FIG. 12 is a flowchart illustrating a method of performing pairing between devices that do not belong to any network, according to another exemplary embodiment.

First through ninth operations illustrated in FIG. 12 are the same as those of FIG. 10, and thus, a description thereof is not provided here.

In a tenth operation, a device C 1210 and a device D 1220 mutually negotiate to establish a PBSS network or an IBSS network.

In an eleventh operation, the device C 1210 and the device D 1220 decide to establish the PBSS network through negotiation.

In a twelfth operation, the device C 1210 and the device D 1220 decide a device to be a PCP in the PBSS network through mutual negotiation.

Figure 13:
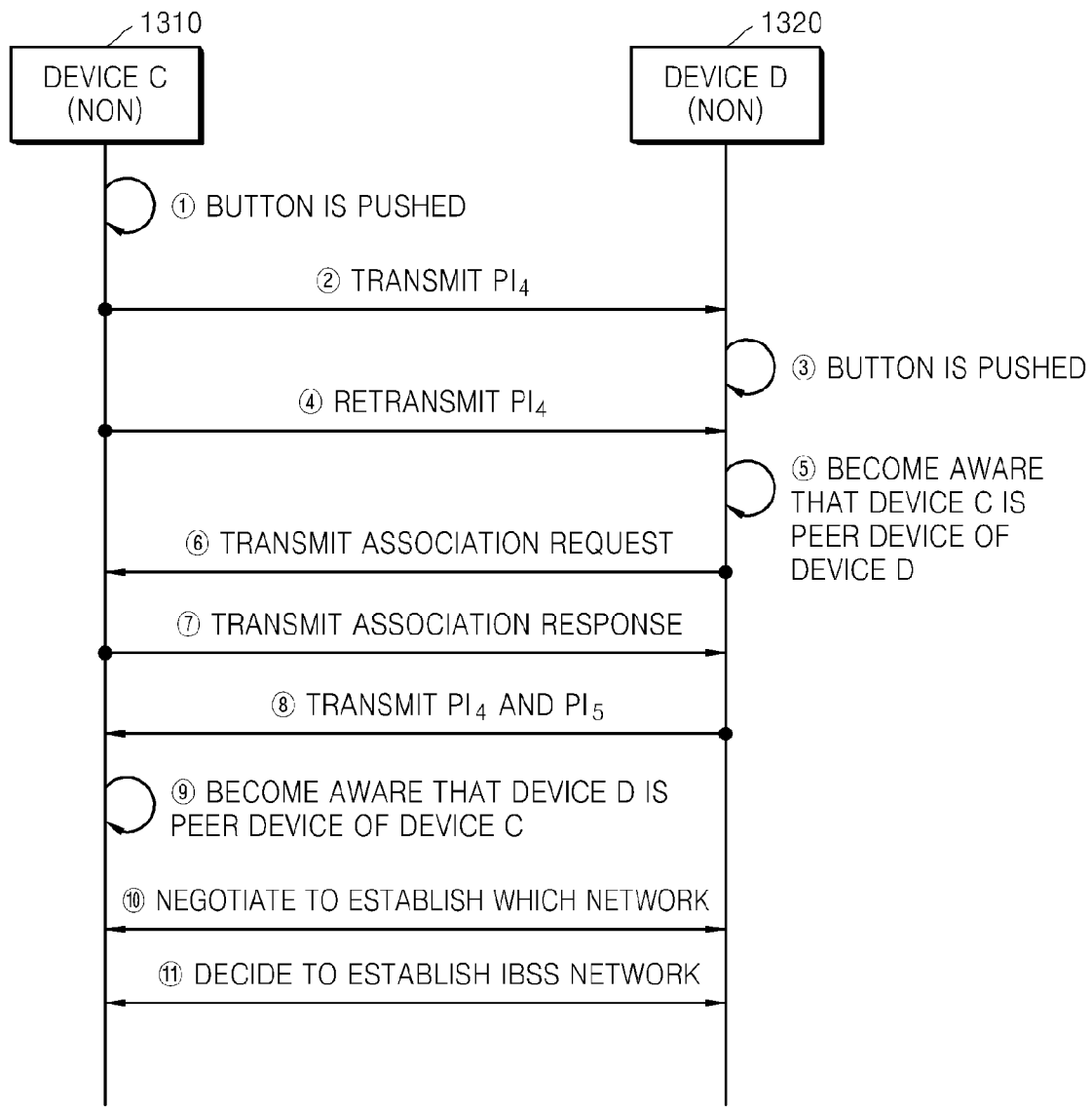
FIG. 13 is a flowchart illustrating a method of performing pairing between devices that do not belong to any network, according to another exemplary embodiment.

FIG. 13 is a flowchart illustrating a method of performing pairing between devices that do not belong to any network, according to another exemplary embodiment.

First through ninth operations are the same as those of FIG. 10, and thus, a description thereof is not provided here.

In a tenth operation, a device C 1310 and a device D 1320 mutually negotiate to establish a PBSS network or an IBSS network.

In an eleventh operation, the device C 1310 and the device D 1320 decide to establish the IBSS network through negotiation.

For example, when both the device C 1310 and the device D 1320 are devices that are not suitable for acting as a coordinator, they may establish the IBSS network.

Figure 14:
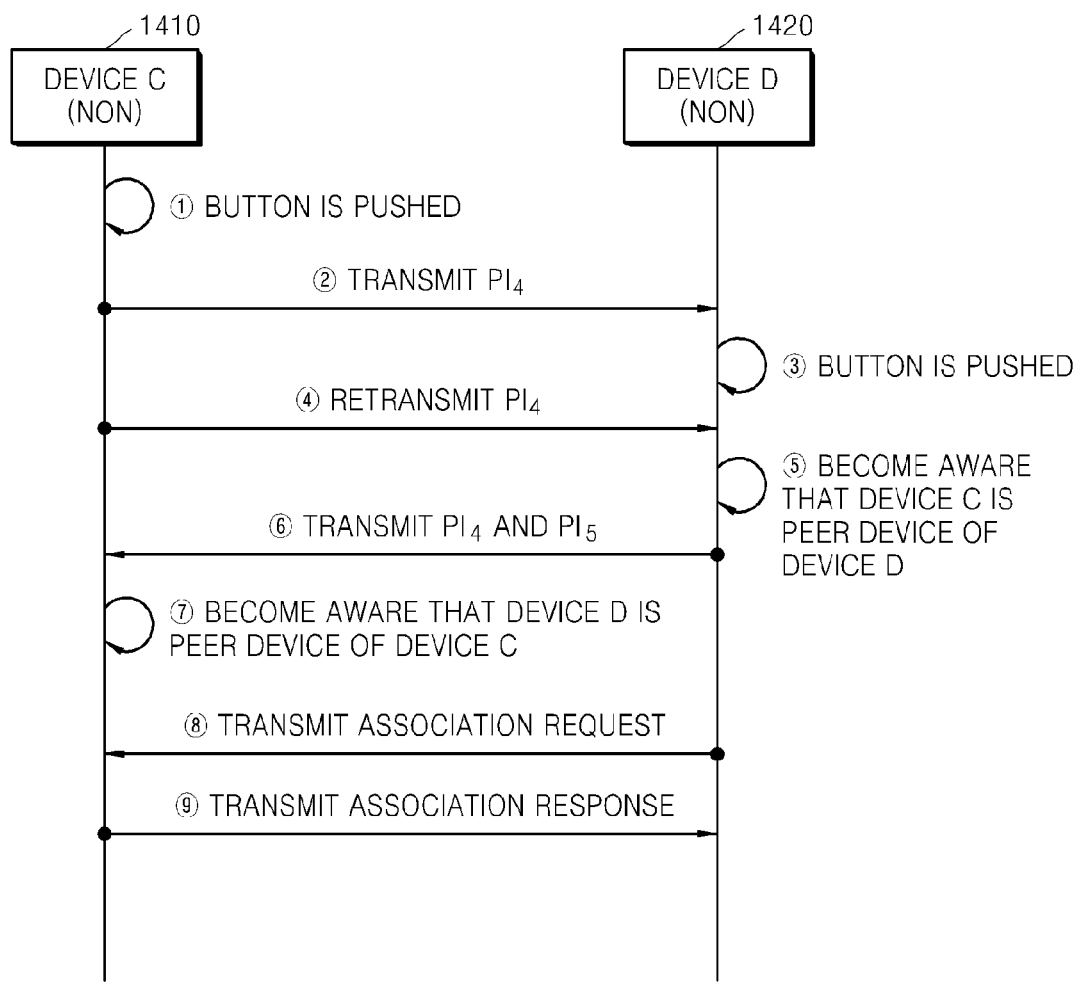
FIG. 14 is a flowchart illustrating a method of performing pairing between devices that do not belong to any network, according to another exemplary embodiment.

FIG. 14 is a flowchart illustrating a method of performing pairing between devices that do not belong to any network, according to another exemplary embodiment.

In a first operation, a button for instructing to perform pairing is pushed by a user of a device C 1410.

In a second operation, the device C 1410 transmits to a device D 1420 fourth pairing information $PI_4$ indicating that the device C 1410 is a device to perform pairing.

In a third operation, a button for instructing to perform pairing is pushed by a user of the device D1420.

In a fourth operation, the device C 1410 retransmits the fourth pairing information $PI_4$ to the device D1420.

In a fifth operation, the device D 1420 becomes aware that the device C 1410 is a peer device of the device D 1420.

In a sixth operation, the device D 1420 transmits to the device C 1410 the fourth pairing information $PI_4$ and fifth pairing information $PI_5$ indicating that the device D 1420 is a peer device to perform pairing.

In a seventh operation, the device C 1410 becomes aware that the device D 1420 is a peer device of the device C 1410.

In an eighth operation, the device D 1420 transmits to the device C1410 an association request to associate with the device C 1410.

In this regard, transmitting of the association request to the device C 1410 by the device D1420 indicates that the device D1420 wants to establish an IBSS network between the device C 1410 and the device D 1420.

In a ninth operation, the device C 1410 transmits to the device D 1420 an association response that approves the association request.

The device D 1420 receives the association response so that the IBSS network can be established between the device C 1410 and the device D 1420.

Figure 15:
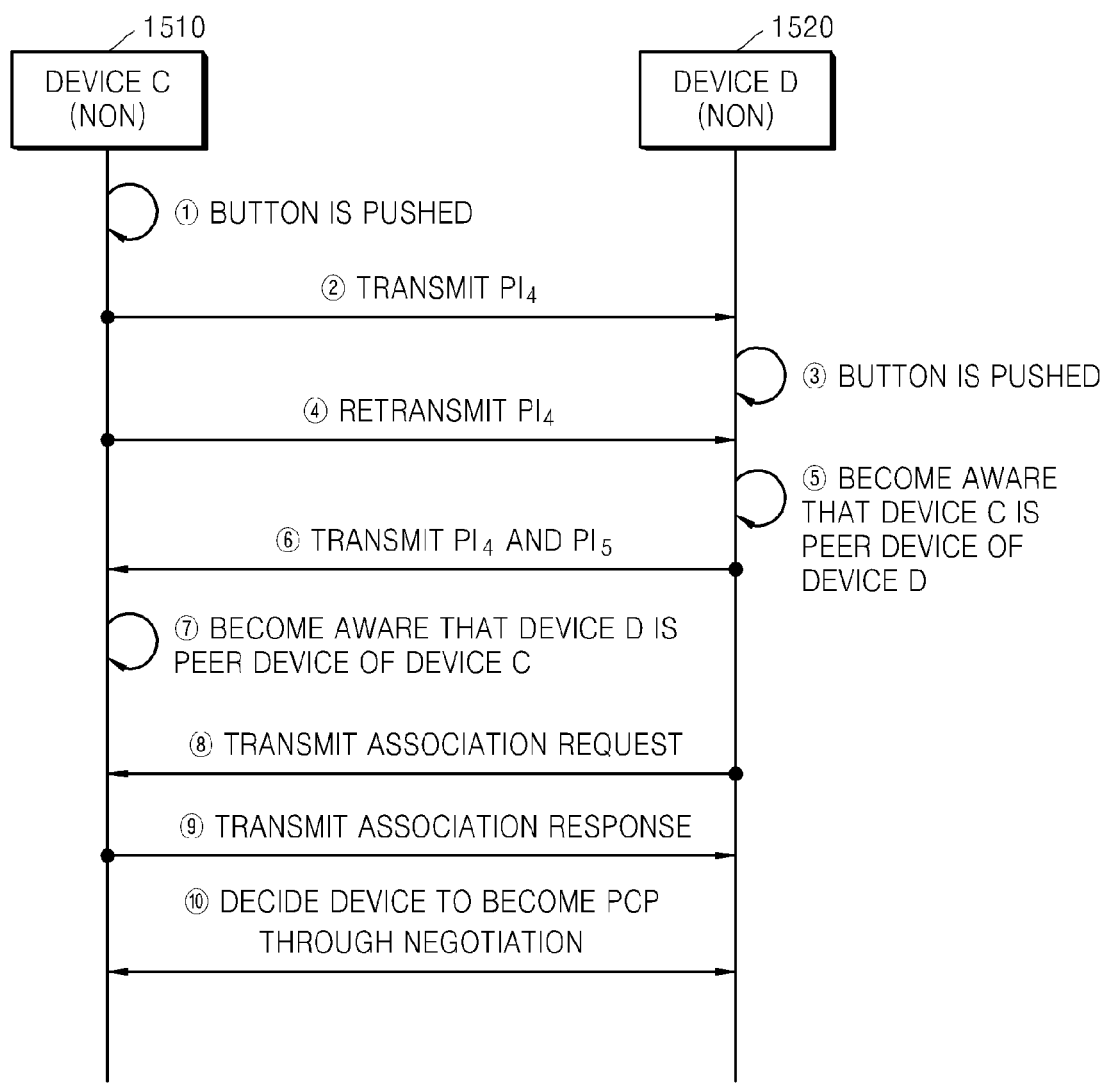
FIG. 15 is a flowchart illustrating a method of performing pairing between devices that do not belong to any network, according to another exemplary embodiment.

FIG. 15 is a flowchart illustrating a method of performing pairing between devices that do not belong to any network, according to another exemplary embodiment.

First through ninth operations are the same as those of FIG. 14, and thus, a description thereof is not provided here.

In a tenth operation, a device C1510 and a device D1520 decide a device to be a PCP through mutual negotiation.

Also, since in the ninth operation, the IBSS network has been established between the device C1510 and the device D1520, if a PCP between the device C1510 and the device D1520 is decided, the IBSS network is converted into a PBSS network.

Figure 16:
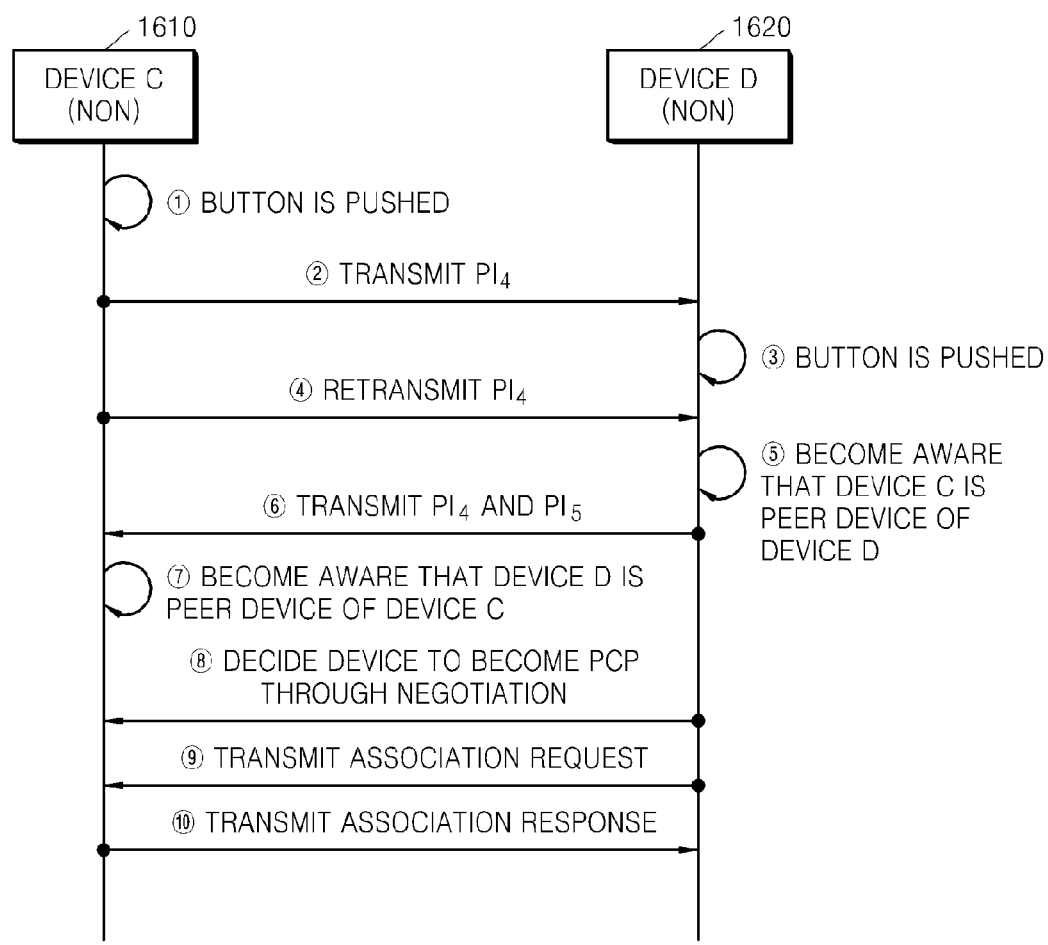
FIG. 16 is a flowchart illustrating a method of performing pairing between devices that do not belong to any network, according to another exemplary embodiment.

FIG. 16 is a flowchart illustrating a method of performing pairing between devices that do not belong to any network, according to another exemplary embodiment.

First through seventh operations illustrated in FIG. 16 are the same as those of FIG. 14, and thus, a description thereof is not provided here.

In an eighth operation, a device C 1610 and a device D 1620 decide a device to be a PCP through mutual negotiation.

In this regard, deciding of the device to be a PCP between the device C1610 and the device D 1620 indicates that the PBSS network is to be established between the device C1610 and the device D1620.

In a ninth operation, the device D1620 transmits to the device C1610 an association request to associate with the device C 1610.

In a tenth operation, the device C1610 transmits to the device D 1620 an association response that approves the association request.

The device D1620 receives the association response so that the device C 1610 and the device D 1620 can form the PBSS network in which the device C 1610 becomes a PCP.

Figure 17:
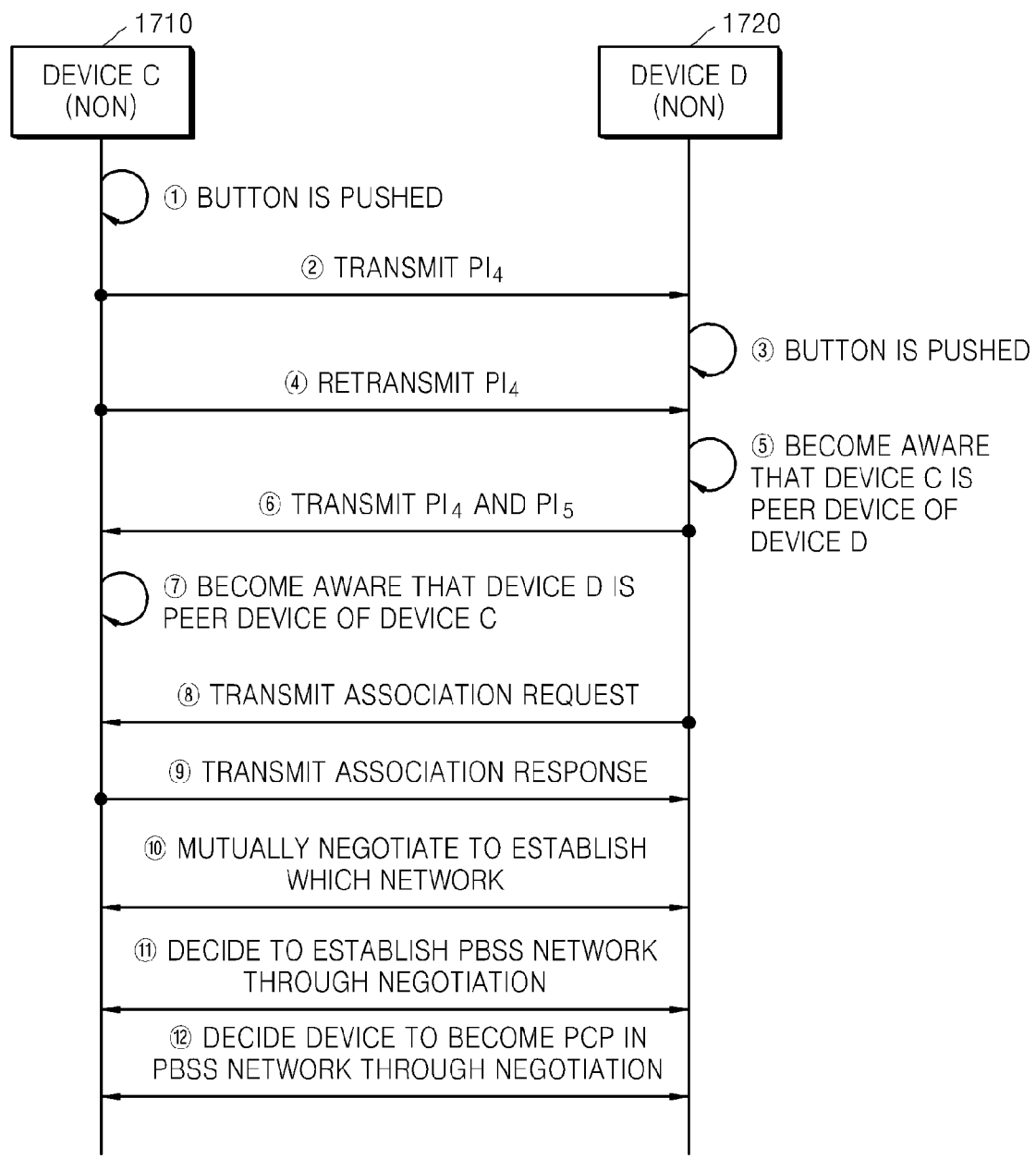
FIG. 17 is a flowchart illustrating a method of performing pairing between devices that do not belong to any network, according to another embodiment of the present invention.

FIG. 17 is a flowchart illustrating a method of performing pairing between devices that do not belong to any network, according to another exemplary embodiment.

First through ninth operations illustrated in FIG. 17 are the same as those of FIG. 14, and thus, a description thereof is not provided here.

In a tenth operation, a device C1710 and a device D1720 mutually negotiate to establish a PBSS network or an IBSS network.

In an eleventh operation, the device C 1710 and the device D1720 decide to establish the PBSS network through negotiation.

In a twelfth operation, the device C 1710 and the device D 1720 decide a device to be a PCP in the PBSS network through mutual negotiation.

Also, since in the ninth operation, the IBSS network has been established between the device C1710 and the device D 1720, if a PCP between the device C1710 and the device D1720 is decided, the IBSS network is converted into the PBSS network.

Figure 18:
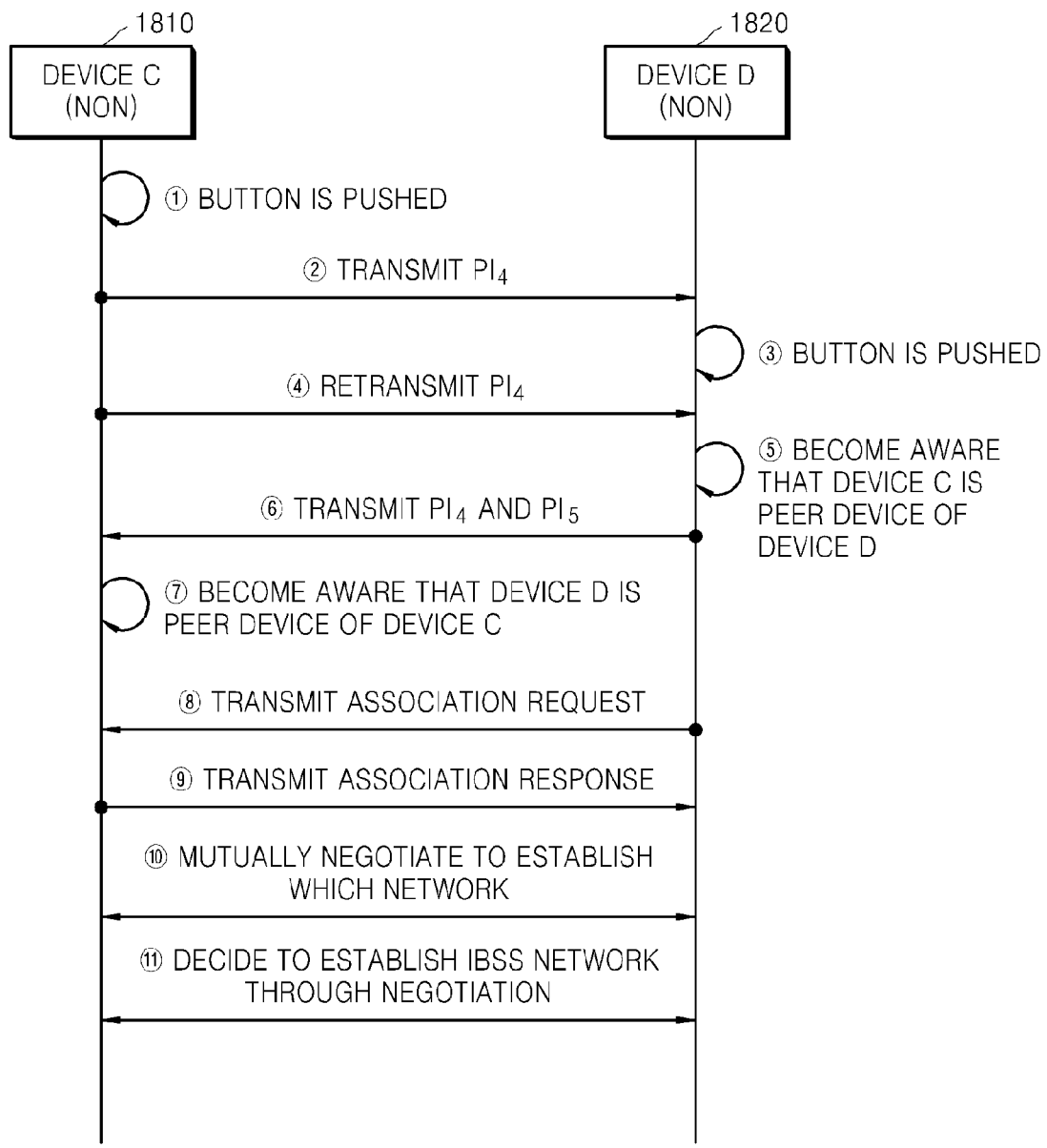
FIG. 18 is a flowchart illustrating a method of performing pairing between devices that do not belong to any network, according to another exemplary embodiment.

FIG. 18 is a flowchart illustrating a method of performing pairing between devices that do not belong to any network, according to another exemplary embodiment.

First through ninth operations are the same as those of FIG. 17, and thus, a description thereof is not provided here.

In a tenth operation, a device C 1810 and a device D 1820 mutually negotiate to establish a PBSS network or an IBSS network.

In an eleventh operation, the device C1810 and the device D1820 decide to establish the IBSS network through negotiation.

In the above-described exemplary embodiments with reference to FIGS. 8 through 18, the method of performing pairing between devices without using a coordinator has been described. In an exemplary embodiment, even when devices do not belong to a predetermined network, a user presses a button for instructing to perform pairing in each of the devices so that pairing between the devices can be automatically performed.

Figure 19:
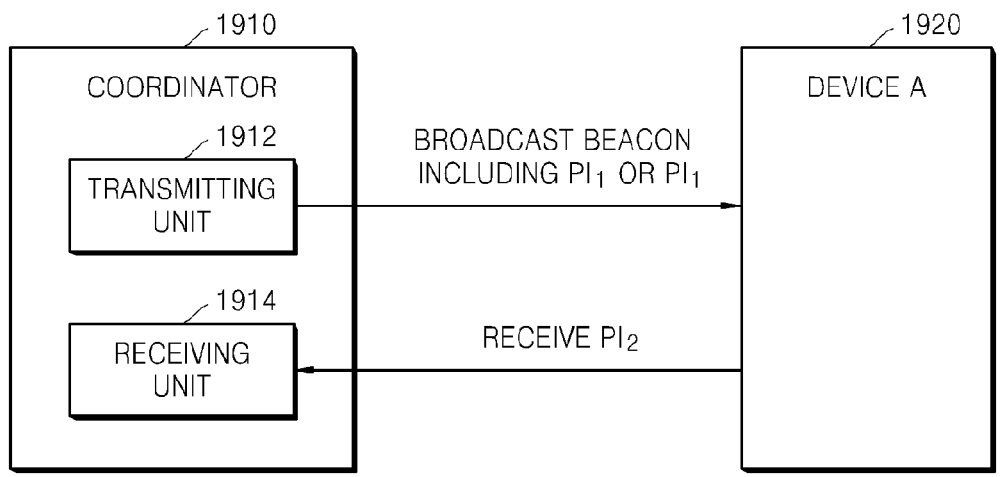
FIG. 19 is a flowchart for explaining a coordinator that performs pairing between devices, according to an exemplary embodiment.

FIG. 19 is a flowchart for explaining a coordinator that performs pairing between devices, according to an exemplary embodiment.

Referring to FIG. 19, a coordinator 1910 according to the current exemplary embodiment includes a transmitting unit 1912 and a receiving unit 1914. For convenience of explanation, FIG. 19 further illustrates a device A 1920.

The transmitting unit 1912 broadcasts a beacon including first pairing information $PI_1$ indicating that the coordinator 1910 is a device to perform pairing, or the first pairing information $PI_1$.

The receiving unit 1914 receives from the device A 1920 second pairing information $PI_2$ indicating that the device A 1920 is a device to perform pairing.

The receiving unit 1914 may further receive from the device A 1920 an association request to associate with a network to which the coordinator 1910 belongs.

In this regard, the second pairing information $PI_2$ may also be included in the association request.

The transmitting unit 1910 may further transmit to the device A 1920 an association response that approves the association request.

The coordinator 1910 according to the current exemplary embodiment may further include a button (not shown) for instructing to perform pairing.

Figure 20:
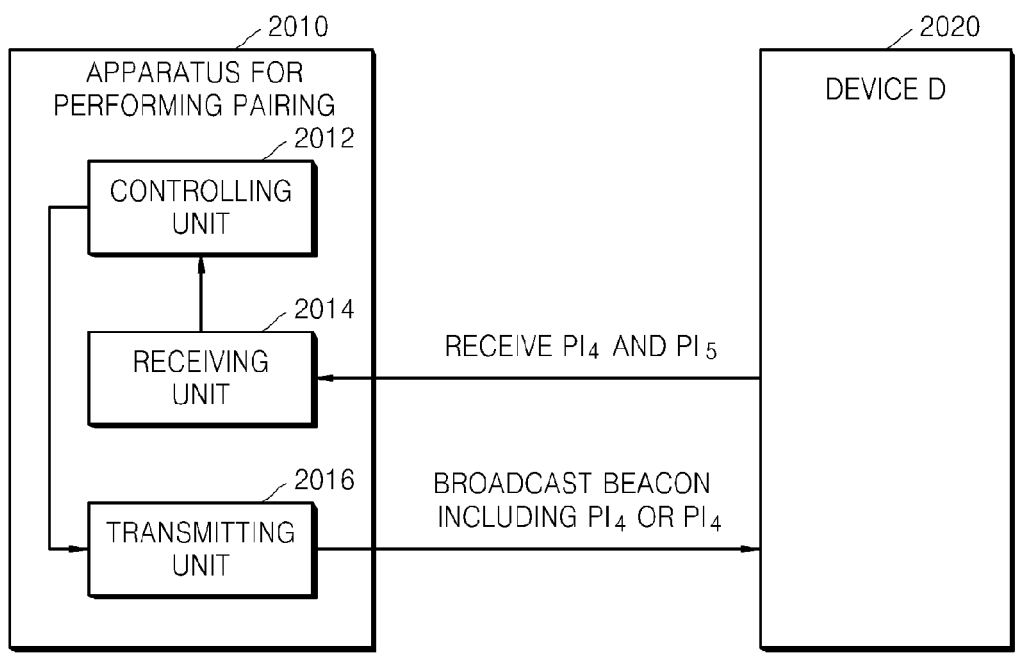
FIG. 20 is a flowchart for explaining an apparatus for performing pairing between devices, according to an exemplary embodiment.

FIG. 20 is a flowchart for explaining an apparatus 2010 for performing pairing between devices, according to an exemplary embodiment.

Referring to FIG. 20, the apparatus 2010 for performing pairing between devices, according to the current exemplary embodiment, includes a controlling unit 2012, a receiving unit 2014, and a transmitting unit 2016. For convenience of explanation, FIG. 20 further illustrates a device D2020, and it is assumed that the apparatus 2010 for performing pairing between devices is installed at a device C (not shown).

The controlling unit 2012 establishes a new network that is different from a network to which the device C belongs, and controls the apparatus 2010 so that the device C may become a coordinator of the new network.

For example, when the apparatus 2010 receives a failure message from the receiving unit 2014, which is transmitted by another apparatus, or when the apparatus 2010 does not receive any message from the receiving unit 2014 within a predetermined amount of time, the controlling unit 2012 establishes a new network and controls the apparatus 2010 so that the device C becomes a coordinator of the new network.

The transmitting unit 2016 broadcasts a beacon including fourth pairing information $PI_4$ indicating that the device C is a device to perform pairing, or the fourth pairing information $PI_4$.

In this regard, when the device C becomes a coordinator of a new network by a control of the controlling unit 2012, the transmitting unit 2016 may broadcast a beacon including the fourth pairing information $PI_4$, or the fourth pairing information $PI_4$. However, if the device C does not become the coordinator of the new network, the transmitting unit 2016 may broadcast only the fourth pairing information $PI_4$.

The receiving unit 2014 receives from the device D 2020 an association request to associate with a new network generated by the device C.

The transmitting unit 2016 further transmits to the device D 2020 an association response that approves the association request.

In addition, the receiving unit 2014 may further receive from the device D 2020 the fourth pairing information $PI_4$ and fifth pairing information $PI_5$ indicating that the device D 2020 is a peer device to perform pairing. In another exemplary embodiment, the receiving unit 2014 may also receive only the fifth pairing information $PI_5$.

The apparatus 2010 for performing pairing between devices, according to the current exemplary embodiment, may further include a button (not shown) for instructing to perform pairing.

An exemplary embodiment can also be embodied as computer readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, etc. Moreover, one or more units of the coordinator 1910, the apparatus for performing pairing 2010, and any of the above-described devices can include a processor or microprocessor executing a computer program stored in a computer-readable medium.

While exemplary embodiments have been particularly shown and described above, it will be understood by those skilled in the art that various changes in form and details may be made therein without departing from the spirit and scope of the present inventive concept as defined by the appended claims. The above-described exemplary embodiments should be considered in descriptive sense only and not for purposes of limitation. Therefore, the scope of the present inventive concept is defined not by the detailed description of exemplary embodiments, but by the appended claims, and all differences within the scope will be construed as being included in the present invention.

What is claimed is:

1. A method of performing pairing between a first device that belongs to a first network and a second device that does not belong to any network, the method comprising:
   receiving, by a coordinator of the first network, first pairing information from the first device;
   broadcasting, by the coordinator of the first network, the first pairing information;
   scanning, by the coordinator of the first network, for a message from the second device for a second critical time from the time when a first critical time has elapsed from the time when the coordinator of the first network has broadcasted the first pairing information; and
   if the coordinator of the first network does not receive the message from the second device, broadcasting, by the coordinator of the first network, the first pairing information and a failure message, wherein the first device becomes a coordinator of a second network after establishing the second network at a second channel different from a first channel that communicates with the coordinator of the first network.

2. A network system comprising a first device that belongs to a first network and a second device that does not belong to any network and performing pairing between the first device and the second device, the network system comprising:
   a first device which transmits, to a coordinator of the first network, first pairing information;
   a second device which transmits, to the first device, second pairing information only after the first device becomes a coordinator of a second network and broadcasts the first pairing information; and
   the coordinator of the first network which broadcasts the first pairing information if the coordinator receives the first pairing information from the first device, and scans for a message from the second device for a second critical time from the time when a first critical time has elapsed from the time when the coordinator of the first network has broadcasted the first pairing information, wherein, if the coordinator of the first network does not receive the message from the second device by the scanning of the message, the coordinator of the first network broadcasts the first pairing information and a failure message, and if the first device receives the first pairing information and the failure message, the first device becomes a coordinator of a second network after establishing the second network at a second channel different from a first channel that communicates with the coordinator of the first network.

3. The network system of claim 2, the first device broadcasts the first pairing information indicating that the first device is a device to perform pairing.

4. A method of performing pairing between a first device that belongs to a first network and a second device that does not belong to any network, the method comprising:
   transmitting, by the first device, first pairing information to a coordinator of the first network;
   receiving, by the first device, the first pairing information and a failure message which are broadcasted from the coordinator of the first network, if the coordinator of the first network does not receive a message from the second device for a second critical time from the time when a first critical time has elapsed from the time when the coordinator of the first network has broadcasted the first pairing information; and if the first device receives the first pairing information and the failure message, becoming, by the first device, a coordinator of a second network after establishing the second network at a second channel different from a first channel that communicates with the coordinator of the first network.

5. A coordinator of a first network comprising:

a receiver configured to receive, from a first device, first pairing information; and a transmitter configured to broadcast the first pairing information, wherein the receiver is further configured to scan a message from a second device, and the transmitter is further configured to, if the receiver does not receive the message from the second device for a second critical time from the time when a first critical time has elapsed from the time when the coordinator of the first network has broadcasted the first pairing information, broadcast the first pairing information and a failure message, wherein the first device becomes a coordinator of a second network after establishing the second network at a second channel different from a first channel that communicates with the coordinator of the first network.

\* \* \* \* \*